(12) United States Patent
Bahm et al.

(10) Patent No.: US 12,556,452 B2
(45) Date of Patent: Feb. 17, 2026

(54) INTEGRATING CLUSTERED NETWORK ORCHESTRATOR WITH HOST CONFIGURATION PROTOCOLS

(71) Applicant: Dell Products L.P., Round Rock, TX (US)

(72) Inventors: Alexander Bahm, Renton, WA (US); Melody Grappo, Seattle, WA (US); Jason Tea, Bellevue, WA (US)

(73) Assignee: Dell Products L.P., Round Rock, TX (US)

( * ) Notice: Subject to any disclaimer, the term of this patent is extended or adjusted under 35 U.S.C. 154(b) by 208 days.

(21) Appl. No.: 18/193,211

(22) Filed: Mar. 30, 2023

(65) Prior Publication Data
US 2024/0333594 A1     Oct. 3, 2024

(51) Int. Cl.
*H04L 41/08* (2022.01)
*H04L 41/0859* (2022.01)
(Continued)

(52) U.S. Cl.
CPC ...... *H04L 41/0894* (2022.05); *H04L 41/0859* (2013.01); *H04L 41/0866* (2013.01)

(58) Field of Classification Search
None
See application file for complete search history.

(56) References Cited

U.S. PATENT DOCUMENTS

2002/0191548 A1* 12/2002 Ylonen ............... H04L 63/0272
                                                    370/254
2008/0304427 A1* 12/2008 Biswas ................ H04L 41/04
                                                    370/255

(Continued)

FOREIGN PATENT DOCUMENTS

WO    WO-2021155928 A1 * 8/2021 ......... H04L 61/2535

OTHER PUBLICATIONS

S. Thomson, et al. "IPv6 Stateless Address Autoconfiguration" IETF Trust, Sep. 2007, https://datatracker.ietf.org/doc/html/rfc4862, Last Accessed Mar. 21, 2023, 30 pages.
CISCO "Configuring IPv6 Client IP Address Learning" CISCO, https://www.cisco.com/en/us/docs/switches/lan/catalyst3850/software/release/3se/consolidated_guide/b_consolidated_3850_3se_cg_chapter_0101011.html, Last Accessed, Mar. 21, 2023, 28 pages.

(Continued)

*Primary Examiner* — Christopher B Robinson
(74) *Attorney, Agent, or Firm* — Amin, Turocy & Watson, LLP

(57) ABSTRACT

Integration of a clustered network orchestrator with host configuration protocols in a distributed node network system can be performed and managed. Respective nodes of the node network can generate, and store in a data store, respective network configuration reports (NCRs) based on respective portions of network configuration-related information relating to an external network host configuration protocol that are received from an external device by the respective nodes. A network management component (NMC) can determine a first network configuration of the network of nodes based on analysis of the NCRs, wherein the first network configuration relates to a first group of network addresses. NMC can determine a second network configuration of the network of nodes based on analysis of other network configuration-related information associated with an internal network configuration protocol associated with the node network, wherein the second network configuration relates to a second group of network addresses.

20 Claims, 10 Drawing Sheets

(51) Int. Cl.
   *H04L 41/0866*   (2022.01)
   *H04L 41/0894*   (2022.01)

(56) References Cited

U.S. PATENT DOCUMENTS

| | | | | |
|---|---|---|---|---|
| 2012/0089707 | A1* | 4/2012 | Baba | H04L 41/0853 |
| | | | | 709/220 |
| 2015/0172104 | A1* | 6/2015 | Brandwine | H04L 41/0681 |
| | | | | 709/224 |
| 2015/0249573 | A1* | 9/2015 | Miller | H04L 45/02 |
| | | | | 709/221 |
| 2016/0087840 | A1* | 3/2016 | Miller | H04L 41/0813 |
| | | | | 709/221 |
| 2018/0324030 | A1* | 11/2018 | Dang | H04L 41/065 |
| 2018/0332064 | A1* | 11/2018 | Harris | G06F 15/16 |
| 2022/0078606 | A1* | 3/2022 | Maeder | H04L 61/5007 |

OTHER PUBLICATIONS

"Elastic IP addresses" AWS, https://docs.aws.amazon.com/AWSEC2/latest/UserGuide/using-instance-addressing.html, Last Accessed Mar. 21, 2023, 15 pages.

"Amazon EC2 instance IP addressing" AWS, https://docs.aws.amazon.com/AWSEC2/latest/UserGuide/using-instance-addressing.html, Last Accessed, Mar. 21, 2023, 12 pages.

Bahm et al. "Integrating Clustered Network Orchestrator With Host Configuration Protocols Facilitated Utilizing Network Pool Information Space" U.S. Appl. No. 19/022,998, filed Jan. 15, 2025, 123 pages.

"FreeBSD Manual Pages" [https://man.freebsd.org/cgi/man.cgi?query=dhcp6c&manpath=ports&sektion=8#end], retrieved Oct. 12, 2025, 3 pages.

"Wide DHCPv6 (KAME)" [https://ipv6int.net/software/wide_dhcpv6.html], retrieved Oct. 12, 2025, 3 pages.

* cited by examiner

INTEGRATING CLUSTERED NETWORK ORCHESTRATOR WITH HOST CONFIGURATION PROTOCOLS

BACKGROUND

A group (e.g., cluster) of nodes can provide a set of services to clients. The nodes of the group can be connected to each other to form a distributed network of nodes. The set of services can include enabling clients to create a file and write data to the file in a node(s) of the group of nodes for storage in the node(s) or read data from a file stored in a node(s) of the group of nodes.

The above-described description is merely intended to provide a contextual overview regarding distributed node systems, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise, analyzing, by a system comprising a processor, network configuration-related information associated with an external network host configuration protocol associated with an external device that is external to a network of nodes, wherein the network configuration-related information can be received from the external device and can relate to a first group of network addresses associated with the external network host configuration protocol. The method further can comprise, based on a result of the analyzing, determining, by the system, a first network configuration applicable to the network of nodes, wherein the first network configuration can comprise usage of the first group of network addresses associated with the network of nodes and externally managed by the external device, and wherein a second network configuration applicable to the network of nodes can comprise usage of a second group of network addresses associated with the network of nodes and internally managed by at least one node of the network of nodes.

In certain embodiments, the disclosed subject matter can comprise a system that can include a memory that can store computer executable components, and a processor that can execute computer executable components stored in the memory. The computer executable components can comprise a network management component that can perform an analysis of network configuration-related data associated with an external network host configuration protocol associated with an external component that is external to a cluster of node devices that form a node device network, wherein the network configuration-related data can be received from the external component and can relate to a first group of network addresses associated with the external network host configuration protocol. Based on a result of the analysis, the network management component can determine a first network configuration of the cluster of node devices. The first network configuration can relate to the first group of network addresses associated with the cluster of node devices and managed by the external component. A second network configuration of the cluster of node devices can relate to a second group of network addresses associated with the cluster of node devices and managed by at least one node device of the cluster of node devices.

In still other embodiments, the disclosed subject matter can comprise a non-transitory machine-readable medium, comprising executable instructions that, when executed by a processor, can facilitate performance of operations. The operations can comprise evaluating network configuration-related information associated with an external network host configuration protocol associated with an external device that is external to a network of nodes, wherein the network configuration-related information is received from the external device and relates to a first group of network addresses associated with the external network host configuration protocol. The operations also can comprise, based on a result of the evaluating, determining a first network configuration usable by the network of nodes, wherein the first network configuration can relate to the first group of network addresses associated with the network of nodes that can be externally managed by the external device, and wherein a second network configuration usable by the network of nodes can relate to a second group of network addresses associated with the network of nodes that can be internally managed by at least one node of the network of nodes based on an internal network configuration protocol.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
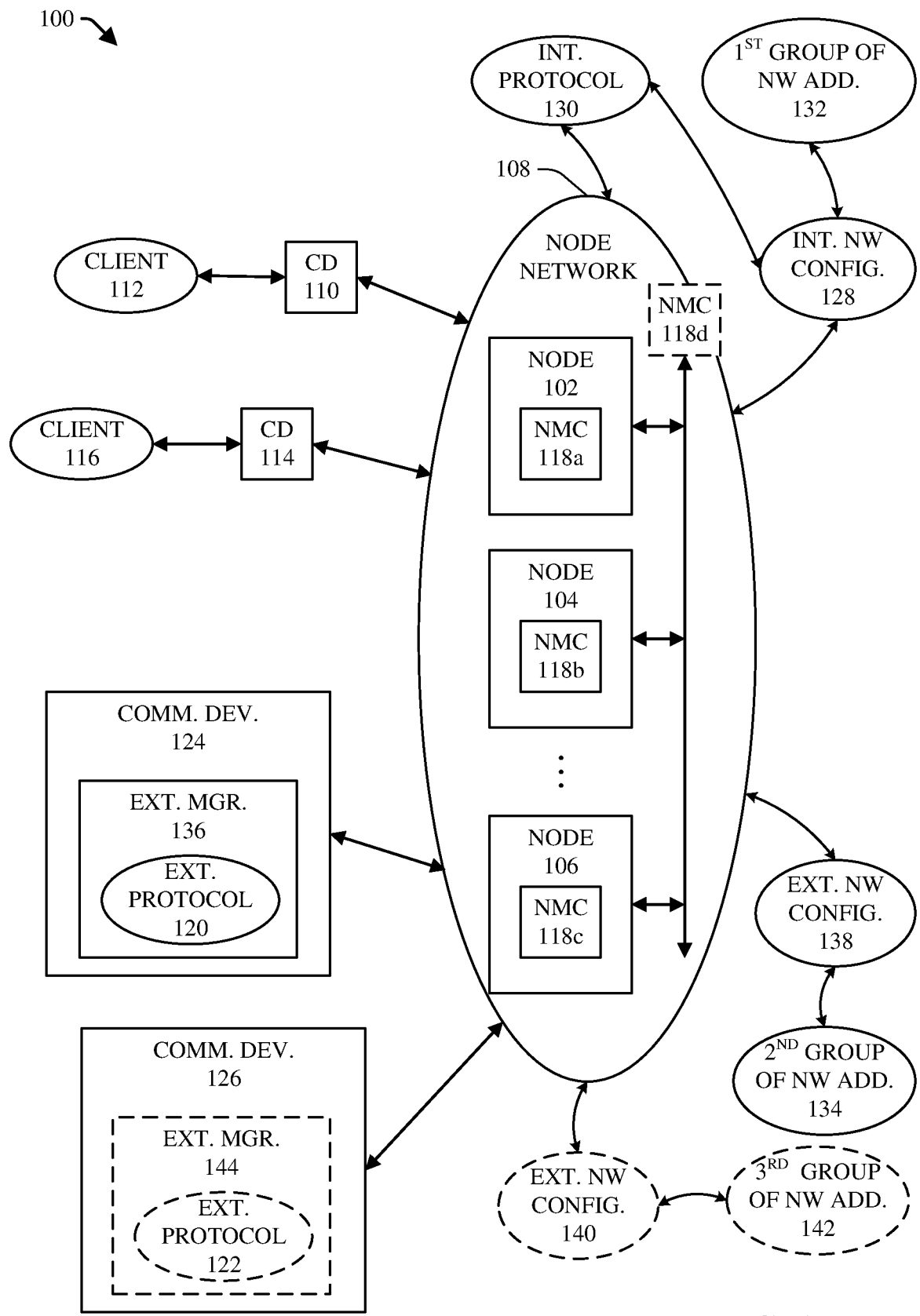
FIG. 1 illustrates a block diagram of a non-limiting example system that can desirably perform and manage integration of a clustered network orchestrator with host configuration protocols in a node network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to distributed node systems, for example, to integrating a clustered network orchestrator with host configuration protocols in a distributed node system. A group (e.g., cluster) of nodes can provide a set of services to clients. The nodes of the group can be connected to each other to form a distributed network of nodes. The set of services can include enabling clients to create a file and write data to the file in a node(s) of the group of nodes for storage in the node(s) or read data from a file stored in a node(s) of the group of nodes. Some clustered node systems can rely on a centralized network configuration and management solution which can be responsible for managing the entire network of nodes on the cluster of nodes. In comparison, common network host configuration protocols, such as dynamic host configuration protocol (DHCP) and stateless address auto configuration (SLAAC) can operate at the individual host/node level and can have expectations of how the end host uses the network (e.g., how the end host uses the network and interacts with the network as a single entity or with the assumption that the network is a single entity, even though the network can comprise multiple nodes). These expectations of such network host configuration protocols can clash significantly with the expectations of many existing cluster network management solutions, such as centralized network configuration and management solutions. It can be desirable (e.g., wanted, beneficial, or optimal) though to integrate external network host configuration protocols, which can operate at the individual host/node level, with node networks that can have centralized network configuration and management.

To that end, techniques for desirably (e.g., efficiently, suitably, or optimally) performing and managing integration of a clustered network orchestrator with host configuration protocols in a distributed node network system are presented. A system (e.g., a distributed node network system) can comprise a group of nodes (e.g., a network and/or cluster of nodes) that can be utilized to process information and provide services to clients (e.g., users and communication devices of users). In some embodiments, the nodes of the group of nodes can be associated with (e.g., communicatively connected to or networked with) the other nodes of the group of nodes.

The respective nodes of the group of nodes can comprise or be associated with a network management component(s) (NMC(s)) that can perform and manage, or facilitate performing and managing, network configurations of the group of nodes, including with regard to network addresses associated with the group of nodes, and integration of a clustered network orchestrator with host configuration protocols in the system. Respective nodes (e.g., respective NMCs of the respective nodes) of the group of nodes can receive respective portions of network configuration-related information relating to an external network host configuration protocol (e.g., SLAAC protocol, DHCP, or other type of external network host configuration protocol) from an external device, which can be external to and associated with (e.g., communicatively connected to) the node network (e.g., a node of the group of nodes). The network configuration-related information can relate to, for example, network addresses associated with the group of nodes, a gateway, a netmask, an identifier of a network interface, a virtual local area network (VLAN) tag, a maximum transmission unit (MTU), and/or other type(s) of network configuration-related characteristic (e.g., attribute or property) associated with the external network host configuration protocol and the group of nodes.

The respective nodes (e.g., the respective NMCs of the respective nodes) can analyze the respective portions of network configuration-related information. Based at least in part on the results of such analyses, the respective nodes (e.g., the respective NMCs of the respective nodes) can generate respective network configuration reports associated with the external network host configuration protocol and the respective nodes. The respective network configuration reports can relate to a first group of network addresses associated with the group of nodes. A network configuration report also can be referred to as a network address or Internet protocol (IP) report. The respective nodes can store the respective network configuration reports in a data store (e.g., a centralized data store of or associated with a node(s) of the group of nodes).

An NMC of or associated with a node can retrieve the respective network configuration reports from the data store, and can analyze the respective network configuration reports. Based at least in part on the results of the analysis of the respective network configuration reports, the NMC can determine a first network configuration of the group of nodes, wherein the first network configuration can relate to the first group of network addresses associated with the group of nodes. The NMC also can determine (e.g., can have previously determined) or can comprise a second (e.g., internal, local, or centralized) network configuration of the group of nodes based at least in part on the results of analysis of other network configuration-related information associated with an internal, local, or centralized network configuration protocol associated with the node network, wherein the second network configuration can relate to a second group of network addresses associated with the group of nodes. In some embodiments, the second network configuration can be defined, configured, or determined by an administrator.

The NMC can implement (e.g., operate, utilize, or apply) or facilitate implementing the first network configuration of the group of nodes that can be associated with the external network host configuration protocol and the second network configuration of the group of nodes that can be associated with the internal, local, or centralized network host configuration protocol associated with the node network. For instance, in connection with determining and implementing the first network configuration and the second (e.g., internal, local, or centralized) network configuration, the NMC can merge or facilitate merging the information in the respective network configuration reports associated with the external network host configuration protocol with or into the second network configuration associated with the group of nodes.

In some instances, there may be more than one external network host configuration protocol (e.g., associated with one or more external devices). In certain embodiments, the NMC can determine respective network configurations (e.g., the first network configuration, a third network configuration, and/or another network configuration(s)) of the group of nodes that can relate to respective external network host configuration protocols (e.g., the external network host configuration protocol and/or one or more other external network host configuration protocols) based at least in part on the results of analyzing respective network configuration reports associated with the respective external network host configuration protocols and the respective nodes of the group of nodes, wherein the respective network configurations can relate to respective groups of network addresses associated with the group of nodes. The NMC can implement (e.g., operate, utilize, or apply) or facilitate implementing (e.g., concurrently, simultaneously, or in parallel) the one or more respective network configurations (e.g., the first network configuration, a third network configuration, and/or another network configuration(s)) of the group of nodes associated with the one or more external network host configuration protocols, and the second (e.g., internal, local, or centralized) network configuration of the group of nodes that can be associated with the internal, local, or centralized network host configuration protocol.

These and other aspects and embodiments of the disclosed subject matter will now be described with respect to the drawings.

Referring now to the drawings, FIG. 1 illustrates a block diagram of a non-limiting example system 100 that can desirably (e.g., efficiently, suitably, or optimally) perform and manage integration of a clustered network orchestrator with host configuration protocols in a node network (e.g., a distributed node network), in accordance with various aspects and embodiments of the disclosed subject matter. The system 100 can comprise a group (e.g., cluster) of nodes (e.g., node equipment or devices), which can comprise a desired number of nodes, including node 102, node 104, and node 106. The nodes (e.g., 102, 104, and/or 106) can be grouped or networked together to form a node network 108, such as a distributed node network. The node network 108 can comprise a file system that can utilize one or more types of protocols to facilitate performance of data management, file management, data processing, file and data storage, file and data communications or transfers, and/or other file and data related functions and processes by the node network. The protocols employed by the node network can comprise virtually any desired protocol, such as, for example, network file system (NFS), pNFS, server message block (SMB), common Internet file system (CIFS), Hadoop compatible file system (HCFS), Hadoop distributed file system (HDFS), file transfer protocol (FTP), OpenStack Swift, hypertext transfer protocol (HTTP), or other desired protocol that can be utilized in file systems.

Each node (e.g., 102, 104, and/or 106) can comprise, employ, and/or access data processing resources (e.g., processor(s)), storage resources (e.g., data store(s)), applications, and/or other resources that can enable the node to perform one or more services. The one or more services can be or can relate to, for example, data processing, video streaming, audio streaming, data security or protection, multimedia service, news service, financial service, social networking, and/or another desired type of service. The nodes can be associated with (e.g., communicatively connected to) each other, for example, through a back-end network.

Each node (e.g., 102, 104, and/or 106) also can comprise a desired number of interfaces (e.g., network or interconnect interfaces), such as described herein. The interfaces of a node can be or can comprise network interfaces or other types of interfaces that can be associated with network addresses and can be utilized to facilitate (e.g., enable) transmitting or presenting information to a user (e.g., client or other user) or a device (e.g., a service server, another node, or a client or communication device, such as a computer, a server, a mobile or smart phone, a virtual assistant (VA) device, an Internet of Things (IoT) device, or other device), or receiving information (e.g., query or request for a service; or request for information) from a user, an application, a service server, or a communication device. Network addresses can be of various types, versions, and/or formats, which can comprise, for example, IP version 4 (IPv4) (e.g., an IPv4 address can be a 32-bit IPv4 address), IP version 6 (IPv6) (e.g., an IPv6 address that can be a 128-bit IPv6 address), and/or other desired type, version, and/or format of network address.

At various times, client devices, such as client device (CD) 110 associated with client 112 and/or client device 114 associated with client 116 can be associated with (e.g., communicatively connected to, via a wired or wireless communication connection) respective nodes (e.g., 102, 104, and/or 106) of the node network 108. For instance, a client device (e.g., 110 or 114) can be connected to a node (e.g., 102, 104, or 106) to write or communicate data (e.g., a query, sensor data, user data, application or service related data, or other data) to the node, or read or receive data (e.g., response to a query, sensor data, user data, application or service related data, or other data) from the node. A client (e.g., 112 or 116) associated with a client device (e.g., 110 or 114) can be a human user, a non-human user, a VA or VA device, an application, a service, another client device, a device or system, or other entity.

Some external network host configuration protocols (e.g., SLAAC protocol, or DHCP) can operate at an individual host/node level. In contrast, some node networks can employ a centralized network configuration that can be responsible for managing an entire network of nodes of a cluster of nodes. It can be desirable to integrate network configurations associated with external network host configuration protocols, which can operate at an individual host/node level, with a centralized network configuration that can be responsible for managing the entire network of nodes of the cluster of nodes. However, integrating such network configurations associated with external network host configuration protocols with a centralized network configuration can be problematic and some possible approaches for doing so can have poor scalability, can be inefficient, and/or can otherwise be undesirable (e.g., unwanted or unsuitable). The techniques of the disclosed subject matter can overcome the deficiencies of such undesirable possible approaches by desirably (e.g., suitably, efficiently, enhancedly, or optimally) integrating network configurations associated with external network host configuration protocols, operating at an individual host/node level, with a centralized network configuration that can be responsible for managing the entire network of nodes of the cluster of nodes, as more fully described herein.

To that end, in accordance with various embodiments, the system 100 can employ a network management component (NMC) 118 that can employ techniques, methods, and processes that can desirably (e.g., suitably, efficiently, reliably, enhancedly, or optimally) integrate network configurations associated with external network host configuration protocols, operating at an individual host/node level, with a centralized network configuration (e.g., associated with an internal, local, or centralized network configuration protocol) that can be responsible for managing the entire group (e.g., cluster) of nodes (e.g., 102, 104, and/or 106) of the node network 108. In some embodiments, each node (e.g., 102, 104, 106) can comprise an NMC (e.g., NMC 118*a*, NMC 118*b*, and NMC 118*c*, respectively) that can perform and manage (e.g., can have the capabilities and functionality to perform and manage) integration of one or more network configurations associated with one or more external network host configuration protocols, operating at an individual host/node level, with an internal network configuration (e.g., an internal, local, or centralized network configuration associated with an internal, local, or centralized network configuration protocol) that can be responsible for managing the entire group (e.g., cluster) of nodes (e.g., 102, 104, and/or 106) of the node network 108, in accordance with the defined network management criteria. In other embodiments, an NMC 118 can reside in one (or more) of the nodes, or can be a standalone component (e.g., NMC 118*d*), or can reside in another device or component, wherein the NMC 118 can be associated with (e.g., communicatively connected to) all of the nodes, and can perform and manage integration of one or more network configurations associated with one or more external network host configuration protocols, operating at an individual host/node level, with an internal network configuration (e.g., an internal, local, or centralized network configuration associated with an internal, local, or centralized network configuration protocol) that can be responsible for managing the entire group (e.g., cluster) of nodes (e.g., 102, 104, and/or 106) of the node network 108, in accordance with the defined network management criteria. In certain embodiments, where respective nodes (e.g., 102, 104, and/or 106) comprise respective NMCs (e.g., NMC 118*a*, NMC 118*b*, and/or NMC 118*c*), it can be desirable to have an NMC (e.g., NMC 118*a*) of or associated with one node (e.g., node 102) that can act or operate as a master or coordinator NMC that can manage or facilitate managing some or all operations of other NMCs and associated nodes of the node network 108, coordinate respective operations of respective NMCs or associated respective nodes, or at least have the one NMC (e.g., NMC 118*a*) perform or manage the process of merging respective network configuration information of respective network configuration reports associated with respective nodes and an external network host configuration protocol with the internal network configuration associated with the group of nodes (e.g., 102, 104, and/or 106), such as described herein.

In accordance with various embodiments, to facilitate such integration of one or more network configurations associated with one or more external network host configuration protocols with the internal network configuration associated with an internal network configuration protocol, each of the nodes (e.g., 102, 104, and/or 106) of the node network 108 (e.g., each of the NMCs 118*a*, 118*b*, and/or 118*c* of the nodes) can comprise a network configuration learner function that can be an interaction point with an external network host configuration protocol (e.g., an external device employing the external network host configuration protocol) to learn or facilitate learning a desired (e.g., intended, wanted, requested, or otherwise desired) network configuration associated with the external network host configuration protocol in relation to the node, and a network configuration reporter function that can generate a network configuration report comprising information relating to the desired network configuration associated with the external network host configuration protocol in relation to the node (e.g., as learned by the network configuration learner function), where such network configuration report can be shared with the rest of the cluster of nodes; and at least one node (e.g., at least one NMC of at least one node) can comprise a network configuration merger function that can merge or integrate the respective desired network configurations associated with the external network host configuration protocol and associated with the respective nodes with the internal network configuration associated with the group of nodes (e.g., 102, 104, and 106) based at least in part on the respective network configuration information contained in the respective network configuration reports generated and provided by the respective nodes, as more fully described herein. The network configuration learner functions, network configuration reporter functions, and network configuration merger function can work together to effectively "crowd source" a desirable network configuration solution with respect to an external network host configuration protocol and the internal, local, or centralized network configuration protocol. This can mean that the NMC 118 can add, integrate, or merge the network configuration (e.g., network configuration relating to network addresses) learned from the external network host configuration protocol to the internal (e.g., internal, local, or centralized) network configuration associated with the group of nodes (e.g., 102, 104, and 106) such that the entire node network 108 (e.g., entire clustered node network system) can make use of the network addresses associated with (e.g., externally managed by) the external network host configuration protocol as the node network 108 would make use of network addresses associated with the administrator-provided network configuration (e.g., internal, local, or centralized network configuration).

The network addresses (e.g., IP addresses) can comprise, for example, primary network addresses, dynamic network addresses, elastic network addresses, or other desired type of network addresses. If and as desired, one or more network addresses associated with one or more external network host configuration protocols (e.g., 120 and/or 122) and one or more network addresses associated with an internal network configuration protocol (e.g., an internal, local, or centralized network configuration protocol of the node network 108) can be associated with or configured on (e.g., concurrently or simultaneously associated with or configured on) the same interface of the node network 108 (e.g., the same interface of a node (e.g., 102, 104, or 106) of the node network 108).

Figure 2:
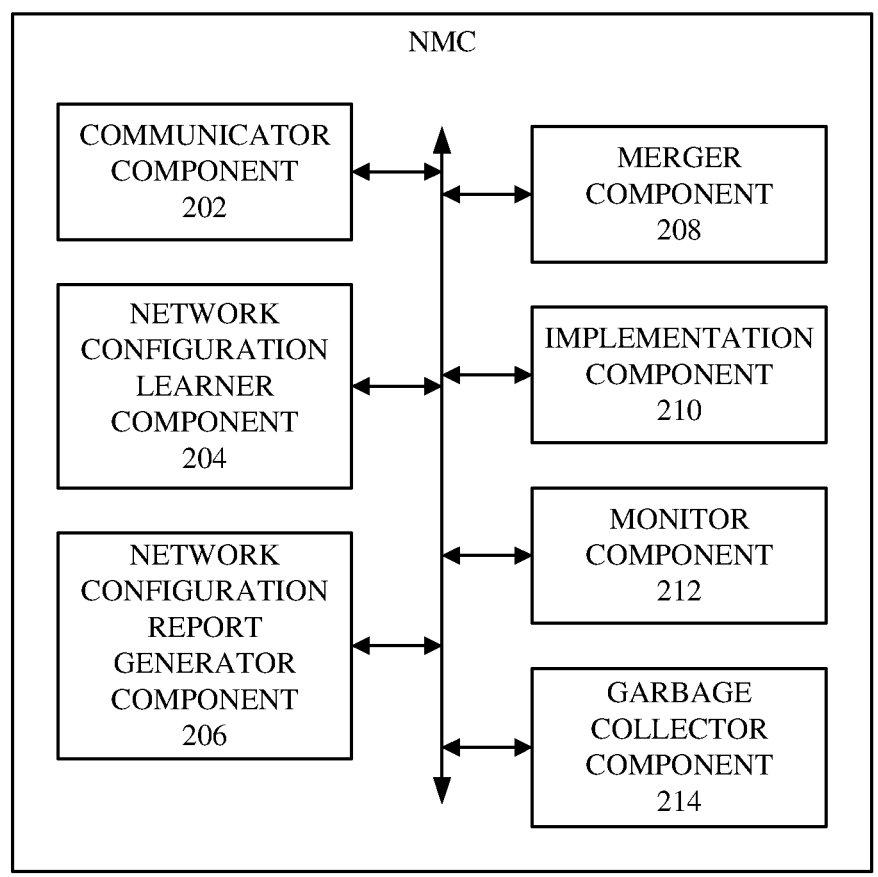
FIG. 2 illustrates a block diagram of an example network management component (NMC), in accordance with various aspects and embodiments of the disclosed subject matter.
Figure 3:
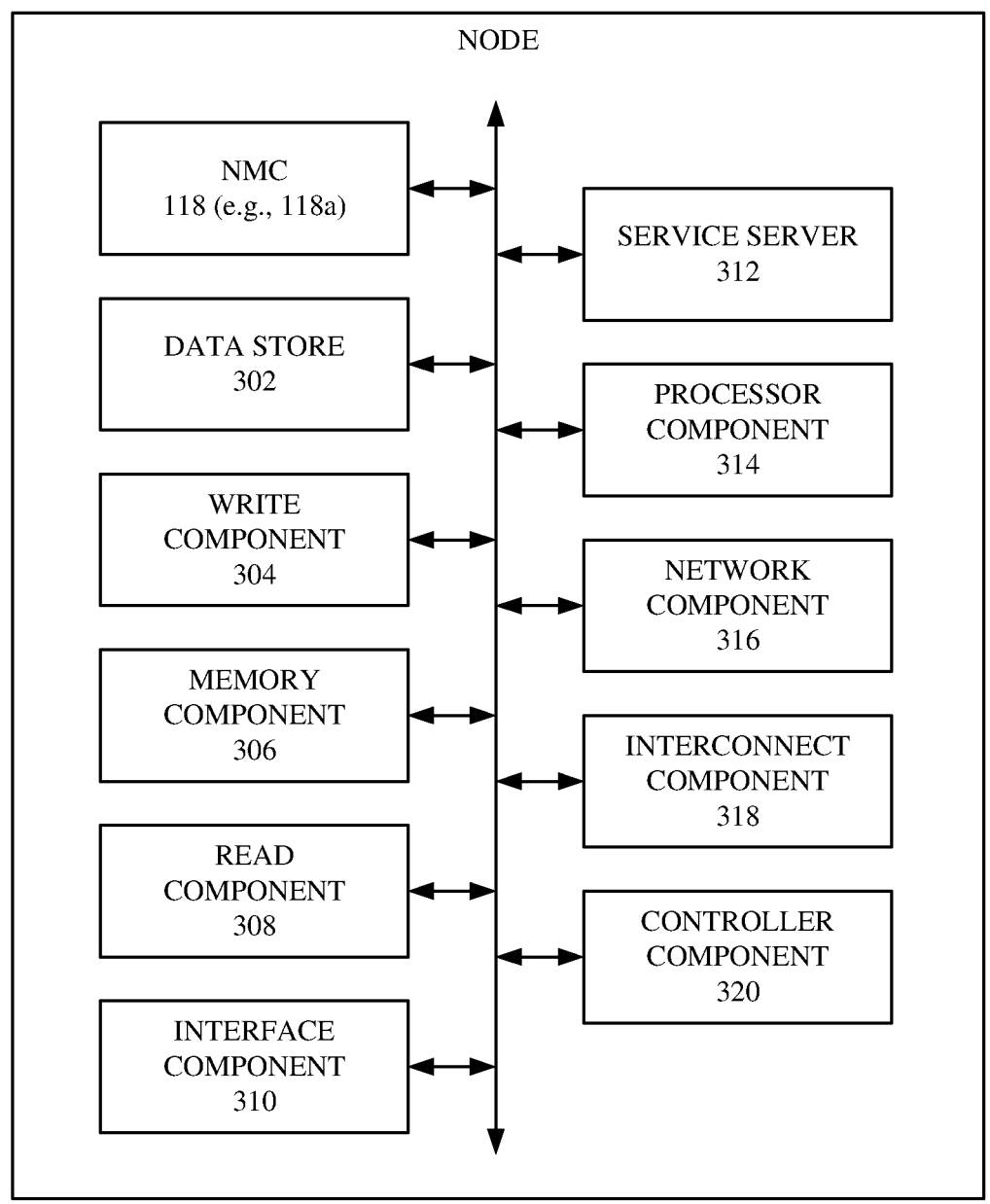
FIG. 3 depicts a block diagram of example node, in accordance with various aspects and embodiments of the disclosed subject matter.
Figure 4:
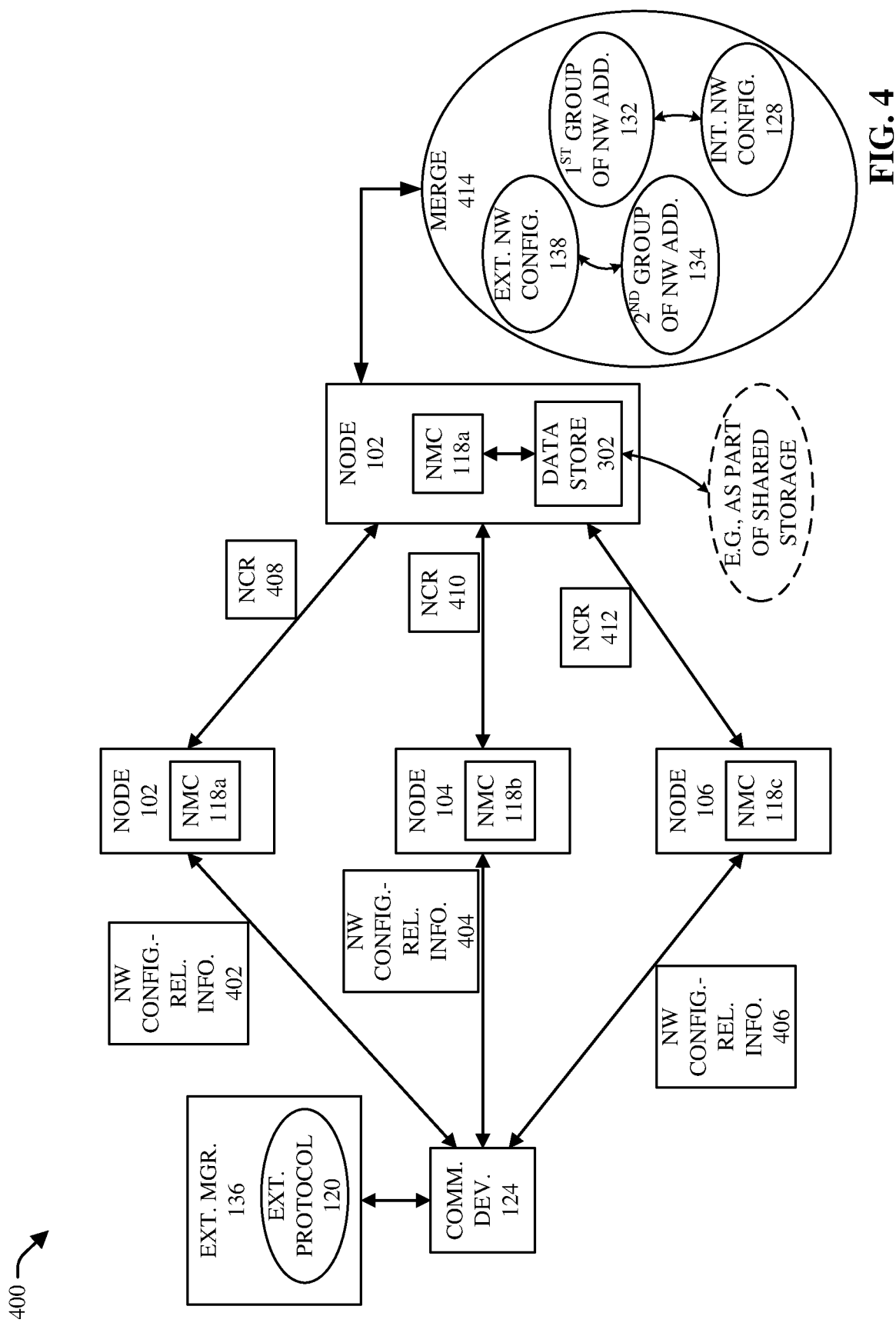
FIG. 4 depicts a block diagram of a non-limiting example network configuration flow process for creating an externally managed network configuration for the node network and integrating the externally managed network configuration with an internally managed network configuration of the node network, in accordance with various aspects and embodiments of the disclosed subject matter.

Referring to FIGS. 2, 3, and 4 (along with FIG. 1), FIG. 2 depicts a block diagram of the NMC 118, FIG. 3 illustrates a block diagram of an example node 102, and FIG. 4 depicts a block diagram of a non-limiting example network configuration flow process 400 for creating an externally managed network configuration for the node network 108 and integrating (e.g., merging) the externally managed network configuration with an internally managed network configuration of the node network, in accordance with various aspects and embodiments of the disclosed subject matter. In some embodiments, the NMCs (e.g., 118a, 118b, 118c) of the nodes (e.g., 102, 104, 106) of the node network 108, or a standalone NMC 118d, can comprise the same or similar components and functionality as the NMC 118, and/or can be configured the same as or similar to the NMC 118. In certain embodiments, the other nodes (e.g., 104, 106) of the node network 108 can comprise the same or similar components and functionality as the node 102, and/or can be configured the same as or similar to the node 102.

The NMC 118 can employ a communicator component 202 that can receive or transmit various types of information (e.g., network configuration-related information and/or protocol-related information associated with an external network host configuration protocol (EXT. PROTOCOL) (e.g., 120 or 122), network address-related or interface-related information, requests, data (e.g., write data, read data, or other data), metadata, and/or other desired information) from or to various devices (e.g., client devices (e.g., 110 or 114), communication devices (COMM. DEV.) (e.g., 124 or 126), nodes (e.g., 102, 104, or 106), components, and/or entities (e.g., clients (e.g., 112 or 116) or other entities). The external network host configuration protocol can be, for example, SLAAC protocol, DHCP, an external network host configuration protocol of a cloud service provider, or other type of external network host configuration protocol (e.g., other third-party external network host configuration protocol).

The NMC 118 can comprise a network configuration learner component 204 that can include the network configuration learner function, which can be an interaction point with an external network host configuration protocol (e.g., 120 or 122) to learn or facilitate learning a desired (e.g., intended, wanted, requested, or otherwise desired) network configuration associated with the external network host configuration protocol in relation to the node (e.g., 102, 104, or 106). The particular or exact implementation of the network configuration learner function can depend in part on the external network host configuration protocol (e.g., 120 or 122), but the network configuration learner function can have a contract with the network configuration reporter function, where the contract of the network configuration learner function can be to not only determine the network addresses, but also attempt to learn other network configuration (e.g., other elements, parameters, characteristics, or properties of the network configuration) that can be relevant to all network addresses learned from the particular external network host configuration protocol, such as described herein.

The network configuration learner component 204 can receive (e.g., by itself or as facilitated via the communicator component 202) information, including, for example, network configuration-related information and/or protocol-related information associated with an external network host configuration protocol, from a device associated with the external network host configuration protocol (e.g., communication device 124 associated with external network host configuration protocol 120, and/or communication device 126 associated with external network host configuration protocol 122), and/or from another entity or device, to facilitate learning characteristics, features, or other desired information relating to the desired network configuration and network addresses associated with the external network host configuration protocol. For instance, with regard to an external network host configuration protocol (e.g., each of one or more external network host configuration protocols), and with regard to a node (e.g., each node of the group of nodes (e.g., 102, 104, 106)), the network configuration learner component 204 (e.g., by itself or as facilitated via the communicator component 202) of the node can receive a portion of network configuration-related information and/or protocol-related information associated with the external network host configuration protocol and related to (e.g., relevant to) the node, from the device associated with the external network host configuration protocol (e.g., communication device 124 associated with external network host configuration protocol 120).

As an example of the NMCs of nodes receiving network configuration-related information associated with the external network host configuration protocol 120, the NMC 118a (e.g., employing its network configuration learner component and communicator component) of the node 102 can receive a first portion of the network configuration-related information (NW CONFIG.-REL. INFO.) 402 and/or protocol-related information associated with the external network host configuration protocol 120 and related to (e.g., relevant to) the node 102, from the communication device 124; the NMC 118b (e.g., employing its network configuration learner component and communicator component) of the node 104 can receive a second portion of the network configuration-related information 404 and/or protocol-related information associated with the external network host configuration protocol 120 and related to the node 104, from the communication device 124; the NMC 118c (e.g., employing its network configuration learner component and communicator component) of the node 106 can receive a third portion of the network configuration-related information 406 and/or protocol-related information associated with the external network host configuration protocol 120 and related to the node 106, from the communication device 124; and/or another NMC (e.g., employing its network configuration learner component and communicator component) of another node can receive another portion of the network configuration-related information and/or protocol-related information associated with the external network host configuration protocol 120 and related to the other node, from the communication device 124.

Such information can be received by the network configuration learner component 204 in response to a request by the communication device (e.g., communication device 124) for access or connection to the node network 108, a request by the NMC 118 to obtain such information from the communication device, a change to the node network 108, or another type of event associated with the node network 108. The network configuration-related information can relate to or indicate, for example, one or more network addresses, a gateway, a netmask, one or more identifiers of one or more network interfaces, an MTU, a DNS configuration, a VLAN tag, and/or other information relating to the network configuration desired (e.g., wanted, requested, or needed) by the external network host configuration protocol or associated external system (e.g., external system employing the external network host configuration protocol and associated communication device).

The types and/or amounts of network configuration-related information associated with an external network host configuration protocol (e.g., 120 or 122) that can be received by an NMC (e.g., 118*a*. 118*b*, 118*c*, or 118*d*) from a communication device (e.g., 124 or 126) or other entity can be based at least in part on the external network host configuration protocol (e.g., SLAAC protocol, DHCP, an external network host configuration protocol of a cloud service provider, or other type of external network host configuration protocol). For instance, an NMC (e.g., 118*a*, 118*b*, 118*c*, or 118*d*) may receive a first network configuration-related information associated with a first external network host configuration protocol (e.g., SLAAC protocol) from a communication device or other entity, and/or may receive a second network configuration-related information associated with a second external network host configuration protocol (e.g., DHCP or other type of protocol) from a communication device or other entity, wherein the types or amounts of information of the first network configuration-related information associated with the first external network host configuration protocol may be different from (e.g., greater or less than, or otherwise different from) the types or amounts of information of the second network configuration-related information associated with the first external network host configuration protocol.

In some embodiments, local network addresses may be linked to appear in the internal (e.g., centralized) network configuration of the node network 108 associated with the internal (e.g., centralized) network configuration protocol, where the node network 108 (e.g., cluster of nodes of the node network 108) typically can have no input regarding such linking of local network addresses. As a result, the network configuration learner component 204 of each node (e.g., 102, 104, or 106) can treat such local network addresses as being associated with an external network host configuration protocol, even though such local network addresses are associated with the internal network configuration protocol. In this case, the network configuration learner component 204 of the node can examine the interfaces of the node, and can learn, and collect (e.g., receive or obtain) and/or report, the network addresses (e.g., local network addresses) already configured on the interfaces (e.g., local interfaces) of the node and/or other information (e.g., other network configuration-related information) relating to such network addresses.

In certain embodiments, with regard to each node of the node network 108 (or at least each node of some of the nodes (e.g., 102, 104, and/or 106) of the node network 108), the network configuration learner component 204 can analyze the portion of the network configuration-related information associated with the external network host configuration protocol (e.g., 120) received by that node from the communication device (e.g., 124). Based at least in part on the results of analyzing the portion of the network configuration-related information, the network configuration learner component 204 can learn or determine characteristics, features, or other desired information relating to the desired network configuration and network addresses associated with the external network host configuration protocol in relation to the node. For instance, based at least in part on such analysis results, the network configuration learner component 204 can learn or determine the network addresses, gateway, netmask, network interfaces (e.g., identifiers of network interfaces), MTU, DNS configuration, VLAN tag, respective items of operational capability information (e.g., capability flags or indicators) relating to, indicating, or specifying respective operational capabilities of or associated with the external network host configuration protocol, and/or other information relating to the network configuration desired (e.g., wanted, requested, or needed) by the external network host configuration protocol (e.g., 120) with respect to (e.g., in connection with) that node.

With further regard to the respective items of operational capability information (e.g., capability flags or indicators), such items of operational capability information can be desirable (e.g., wanted, needed, or useful) for integrating a legacy node system that assumed full administrator control of the network with a network that only permits partial administrator control of the network. The respective items of operational capability information can be specific to each implementation of integration of an external network host configuration protocol (e.g., 120 or 122) and can operate at the level of individual configuration parameters. A job or purpose of an item of operational capability information can be to indicate what options or operations are allowed or not allowed for the particular network (e.g., externally managed network). For instance, in some cases, networks that were learned from an external network host configuration protocol will not allow their network addresses or interfaces to be edited, which can mean that the capability flags for editing network addresses and interfaces would be disabled for the administrator or the NMC 118. When the NMC 118 or the administrator (e.g., via a request to the NMC 118) wants to modify a network configuration option associated with an external network host configuration protocol (e.g., 120 or 122), the NMC 118 can check (e.g., examine or analyze) the items of operational capability information (e.g., capability flags or indicators) associated with that external network host configuration protocol to determine whether that operation is disabled or not (e.g., to determine or verify whether the requested operation to modify the network configuration option is valid). As part of the merging of network configuration reports (as described herein), the NMC 118 can take the items of operational capability information (e.g., capability flags or indicators) from the network configuration reports and integrate them into a global configuration store (e.g., in shared storage, which can comprise a data store 302 of the node or other desired storage location) for that network.

TABLE 1 can provide some non-limiting examples of respective fields that can relate to respective settings (or associated parameters) that can be modifiable or can be non-modifiable with regard to respective network configuration protocols and networks, such as an administrator-defined network configuration protocol (ADMIN) (e.g., internal or centralized network configuration protocol), DHCP, and a SLAAC protocol, wherein the settings (or associated parameters) and the respective fields can relate to or indicate respective operations that the NMC 118 (or other component of the system 100) may or may not be able to perform, and/or respective network configuration options that the NMC 118 or administrator may or may not be able to modify.

TABLE 1

| SETTING | ADMIN | DHCP | SLAAC |
|---|---|---|---|
| subnet name | x | x | x |
| allocation mode | (1) | x | x |

TABLE 1-continued

| SETTING | ADMIN | DHCP | SLAAC |
|---|---|---|---|
| aggregation mode |  | x | x |
| description |  |  |  |
| interfaces |  |  | x |
| IP ranges |  |  | x |
| static routes |  |  |  |
| DNS zone |  |  |  |
| TTL |  |  |  |

In some embodiments, the items of operational capability information (e.g., capability flags or indicators) associated with a particular protocol can be based at least in part on the fields and associated indicators presented in TABLE 1, where "x" can be an indicator that the associated field can be non-modifiable, and no "x" (e.g., a blank space of a cell of the table) can indicate that the associated field can be modifiable. For instance, the capability flags that can be set on a particular network pool associated with a particular protocol can be based at least in part on the fields and associated indicators presented in TABLE 1. Also, in TABLE 1, "TTL" can mean time-to-live. With regard to the numerical indicator (1) in TABLE 1, indicator (1) can indicate that the allocation mode associated with the administrator-defined network configuration protocol cannot be changed to externally managed. The externally managed allocation mode and corresponding externally managed allocation method can be utilized with regard to network pools (e.g., network pools relating to network addresses) that can externally managed by an external manager, and can be utilized to distinguish them from other network pools that can be managed and/or defined by an administrator. It is to be appreciated and understood that, in accordance with various embodiments, the settings or parameters of such a table can have more, less, or different settings or parameters than those shown in TABLE 1, and respective settings or parameters of such a table can have respective information or indicators (e.g., "X" or no "X" or explicit indicator) associated therewith, in accordance with the respective protocols.

In accordance with various embodiments, the NMC 118 of a node (e.g., 102, 104, and/or 106) can comprise a network configuration report generator component 206 (e.g., employing the network configuration reporter function) that can generate network configuration reports based at least in part on the characteristics, features, or other desired information relating to the desired network configuration and network addresses associated with the external network host configuration protocol (e.g., 120) in relation to the node (e.g., 102, 104, or 106), as learned or determined by the network configuration learner component 204. For instance, with regard to each node of the node network 108 (or at least each node of some of the nodes (e.g., 102, 104, and/or 106) of the node network 108), the network configuration report generator component 206 can generate a network configuration report comprising network configuration information relating to the characteristics, features, or other desired information relating to the desired network configuration and network addresses associated with the external network host configuration protocol (e.g., 120) with respect to the node (e.g., 102, 104, or 106). The network configuration information of the network configuration report can indicate or specify a node identifier associated with the node associated with the network configuration report, a protocol identifier that can identify the external network host configuration protocol, the respective items of operational capability information (e.g., capability flags or indicators) associated with the external network host configuration protocol, the network addresses, gateway, netmask, network interfaces (e.g., identifiers of network interfaces), MTU, DNS configuration, VLAN tag, and/or other information associated with the external network host configuration protocol (e.g., 120) with respect to the node (e.g., 102, 104, or 106).

For example, the NMC 118a (e.g., employing its network configuration report generator component) of the node 102 can generate a first network configuration report (NCR) 408 comprising first network configuration information relating to a first portion (e.g., part) of the characteristics, features, or other desired information relating to the desired network configuration and network addresses associated with the external network host configuration protocol (e.g., 120) with respect to the node 102; the NMC 118b (e.g., employing its network configuration report generator component) of the node 104 can generate a second network configuration report 410 comprising second network configuration information relating to a second portion of the characteristics, features, or other desired information relating to the desired network configuration and network addresses associated with the external network host configuration protocol (e.g., 120) with respect to the node 104; the NMC 118c (e.g., employing its network configuration report generator component) of the node 106 can generate a third network configuration report 412 comprising third network configuration information relating to a third portion of the characteristics, features, or other desired information relating to the desired network configuration and network addresses associated with the external network host configuration protocol (e.g., 120) with respect to the node 106; and/or another NMC (e.g., employing its network configuration report generator component) of another node can generate another network configuration report comprising other network configuration information relating to another portion of the characteristics, features, or other desired information relating to the desired network configuration and network addresses associated with the external network host configuration protocol (e.g., 120) with respect to the other node.

In certain embodiments, as part of generating the network configuration information of a network configuration report, the network configuration report generator component 206 can convert the network configuration-related information associated with the external network host configuration protocol (e.g., 120) obtained from the communication device (e.g., 124) or other entity to a desired format (e.g., desired data or file format or structure), regardless of the external manager of or associated with the external network host configuration protocol (e.g., 120), communication device (e.g., 124), or other entity, and regardless of the format employed by the external manager. The network configuration information in the network configuration report can be in the desired format, which can be an extensible markup language (XML) format or other desired type of format. The network configuration reports can thereby be in a format that can be agnostic to the type of external network host configuration protocol and the external manager of or associated with the external network host configuration protocol.

In accordance with various embodiments, the network configuration learner component 204 and/or the network configuration report generator component 206 can contain a desirable (e.g., suitable, requisite, or optimal) level of external manager specific awareness to enable the other parts of the NMC 118 or system 100 to be agnostic in terms of implementation. The network configuration learner component 204 and/or the network configuration report generator component 206 can comprise respective subcomponents that can learn information (e.g., network configuration-related information or other information) from and/or integrate with respective external managers associated with respective external network host configuration protocols. The network configuration report generator component 206 can coalesce (e.g., fuse, combine, or synthesize) the desired information, including desired network configuration-related information or other information associated with an external network host configuration protocol, convert the desired information into the desired format (e.g., XML format or other desired type of format), and/or push it (e.g., in the form of a network configuration report in the desired format) to the file system (e.g., by storing the reports in shared storage, which can comprise the data store (e.g., 302) of or associated with one or more nodes (e.g., 102, 104, and/or 106)) of the node network 108. In some embodiments, the data storage where the respective network configuration reports associated with respective nodes (e.g., 102, 104, and/or 106) and the respective external network host configuration protocols (e.g., 120 and/or 122) can be stored can be the shared storage of the file system or database of or associated with the node network 108. In certain embodiments, the shared storage can comprise storage of the network configuration reports in the respective data stores of or associated with the respective nodes (e.g., 102, 104, and/or 106) of the node network 108, and the storing of the network configuration reports can be synchronized across the respective data stores of or associated with the respective nodes. Utilizing a shared storage to store the network configuration reports can ensure that, regardless of which node (e.g., employing its merger component 208) merges the network configuration reports, any such node of the node network 108 can have access to the shared storage, and the network configuration reports stored therein, and thus, can have the same information available to them when any such node (e.g., acting as master or coordinator node, comprising a master or coordinator NMC is performing the merge process on the network configuration reports, such as described herein.

A desirable reason for writing the network configuration reports (e.g., IP reports) to shared storage (e.g., to shared storage on disk), as opposed to forwarding network configuration reports over the network (and thus, not storing those reports) can be that, if the network configuration reports are not stored to shared storage, this can make the job of the merger component 208 undesirably (e.g., unsuitably, significantly, inefficiently, and/or otherwise undesirably) more complicated, especially during a failover event involving failure of the merger component 208 or associated node. For instance, if the network configuration reports were not stored in shared storage on disk, and the merger component 208 of a node had a failover event, if a new network configuration report were to be forwarded to the merger component 208, the merger component 208 would have to decide whether the content in that new network configuration report is already present, and/or decide whether there is old, outdated, or invalid content (e.g., old, outdated, or invalid network configuration-related content) that has to be removed. The merger component 208 also would have to handle what happens if it missed a network configuration report during the failover event and/or decide how to handle a node that has been removed from the cluster of nodes. These issues, individually and collectively, can be or can present undesirable complications. In contrast, the disclosed subject matter, by having the network configuration reports stored in shared storage (e.g., on disk), can avoid such undesirable complications and can avoid having to design an undesirably complicated system to handle such undesirable complications.

In some embodiments, the respective or individual integrations and subcomponents of the network configuration learner component 204 and/or the network configuration report generator component 206 can generate a desired structure, comprising certain structs (e.g., structs for externally managed network addresses), for each of the network addresses they learn from the respective external managers. For example, one struct can be employed to comprise or hold desired interface and node information, and another struct can be employed to comprise or hold network address information, including family and/or prefix length. If the interface is a VLAN interface, the structure can comprise information indicating that the interface is a VLAN interface and/or identifying the VLAN interface. These individual structs associated with externally managed network addresses can be contained in a structure that can store the collection of network configuration reports of each node. Such structure can comprise information regarding an identifier (e.g., device or node identifier) associated with a node (e.g., 102, 104, or 106), a source (e.g., DHCP, SLAAC, or cloud service provider) of the network address, a struct containing a set of externally managed network addresses (e.g., the structures containing information relating to the set of externally managed network addresses), and/or other desired information (e.g., information relating to network configuration associated with the external network host configuration protocol).

In some embodiments, the NMC 118 can create a struct for a network address that is to be externally managed, wherein the struct can be in a desired format. The struct for the network address can comprise various information (e.g., network configuration information), such as, for example, information relating to the interface (e.g., interface on which the network address is being configured), information relating to the node (e.g., node comprising the interface), information relating to a VLAN interface (e.g., if the network address is being configured on a VLAN interface), information relating to the network address (e.g., the network address, and/or family, prefix length, and/or other information relating to the network address), and/or other desired information.

These individual structs can be contained within a structure that can store the collection of network configuration reports (e.g., network address reports) of each node (e.g., 102, 104, 106), where such structure can be in or correspond to a desired or defined format. For instance, the struct associated with a network configuration report associated with a node can comprise information, such as a device identifier associated with the node, a source of the network address (e.g., DHCP, SLAAC, cloud, or other external source), information comprising or relating to a group of network addresses that is to be externally managed by the external manager and associated external network host configuration protocol, and/or other desired information.

In certain embodiments, the NMC 118 (e.g., employing the network configuration report generator component 206) can employ desired read operations and write operations to the file system of the node network 108 to support structs relating to network configuration reports, such as those identified herein, and to write (e.g., create or generate) network configuration reports, store network configuration reports in the shared storage, and read network configuration reports from the shared storage such that the respective network configuration reports can be separated (e.g., separately identifiable and/or separately stored in shared storage) based at least in part on the respective external managers (and respectively associated external network host configuration protocols) and the respective nodes (e.g., 102, 104, and/or 106) associated with the respective network configuration reports. For instance, with regard to each external manager (and associated protocol (e.g., 120 or 122), the network configuration report generator component 206 can store the network configuration report files associated with the respective nodes (e.g., 102, 104, and/or 106) in the external manager namespace associated with the external manager in the shared data storage of the node network 108.

Figure 5:
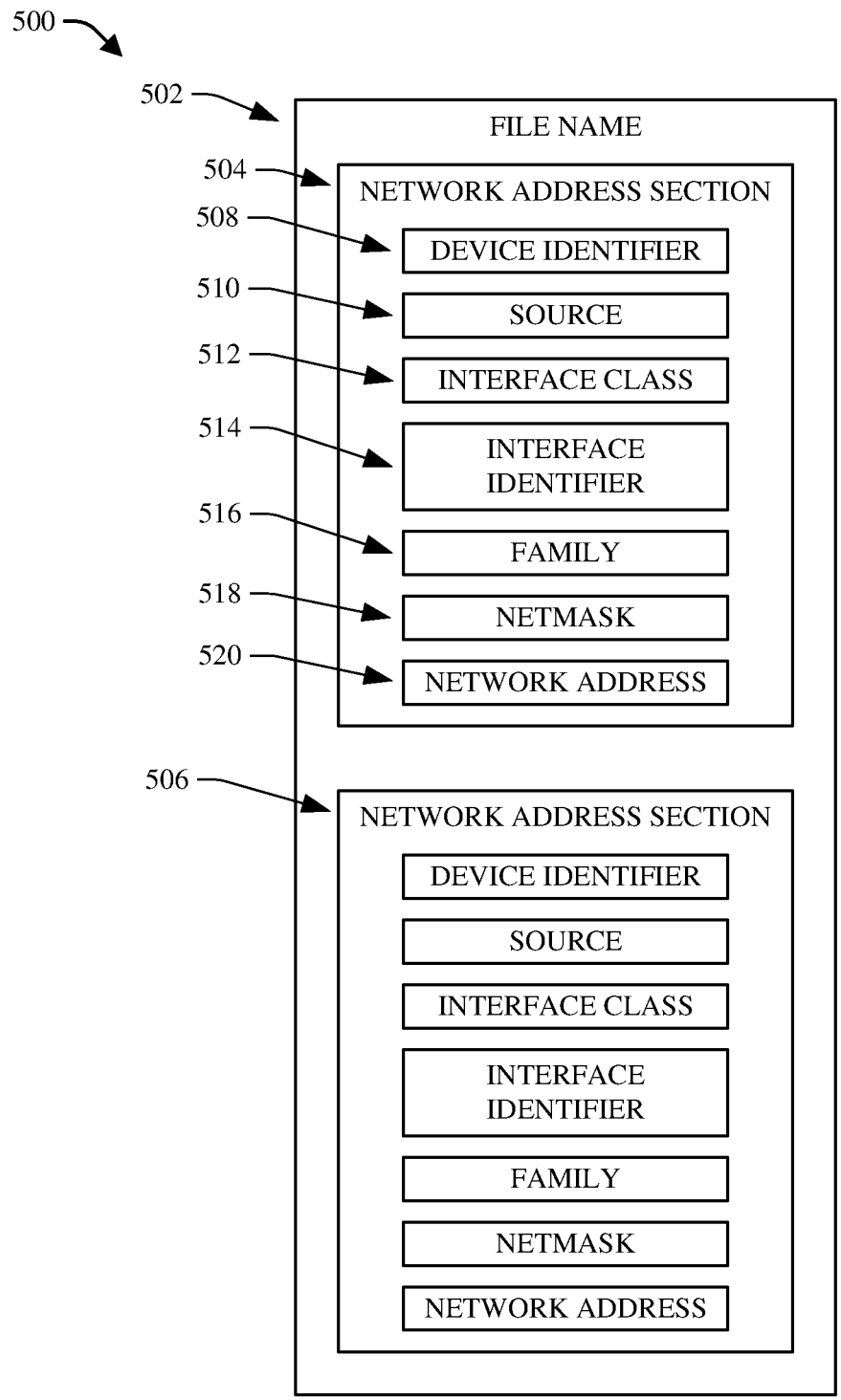
FIG. 5 presents a diagram of a non-limiting example network configuration report, which can be associated with a node of the node network and an external network host configuration protocol, in a desired converted and/or agnostic format, in accordance with various aspects and embodiments of the disclosed subject matter.

In some embodiments, the network configuration report generator component 206 can convert the structure of the network configuration report to a desired non-limiting example format presented in FIG. 5, and described herein, regardless of the external manager and associated external network host configuration protocol. Referring briefly to FIG. 5 (along with FIGS. 1-4), FIG. 5 presents a diagram of a non-limiting example network configuration report 500, which can be associated with a node of the node network 108 and an external network host configuration protocol, in a desired converted and/or agnostic format, in accordance with various aspects and embodiments of the disclosed subject matter. The network configuration report 500 can relate to an external network host configuration protocol, such as DHCP, SLAAC, a protocol associated with a cloud service provider, or other type of external network host configuration protocol. In accordance with various embodiments, the network configuration report generator component 206 can convert (e.g., modify, translate) network configuration-related information associated with the external network host configuration protocol to a desired format (e.g., XML format or other desired agnostic or usable format) to generate the network configuration report 500.

The example network configuration report 500 can comprise various fields (e.g., data fields) in which respective items of network configuration information, which can be associated with the external network host configuration protocol that can be associated with the external manager, can be inserted or located. The various fields can comprise, for example, a file name 502, and an address section (e.g., 504 and 506) for each network address. With regard to each address section (e.g., 504), the fields of the report 500 also can comprise, for example, a device identifier 508 (e.g., identifier of a node) associated with a network address, a source 510 (e.g., DHCP, SLAAC, cloud, or other source) of the information relating to the network address, an interface class 512 (e.g., interface class, comprising interface class type, interface class index, interface class flags, and/or other interface class-related information) associated with the interface, an interface identifier 514 associated with the interface, a family 516 associated with the network address, a netmask 518 associated with the network address, the network address 520 (e.g., IP address: 10.205.228.94, or IP address: 2620:0:170:7c08:0:ffff:adb:36f9), and/or other desired information relating to the network address. As an example of other information that may be desired, in some embodiments, with regard to a SLAAC protocol, the fields of the report 500 can comprise a VLAN identifier associated with the interface (e.g., if the network configuration-related information comprises the VLAN identifier).

The report 500 can comprise same or similar fields of information for each network address included in the report 500. For example, another address section 506 relating to another network address (e.g., IP address: 10.205.228.99, or IP address: 2620:0:170:7c08:0:ffff:adb:3fff) can include same or similar fields comprising respective and corresponding items of information relating to that other network address, such as presented in the report 500.

With further regard to FIGS. 1-4, as disclosed, different external sources (e.g., communication device (e.g., 124 or 126), external manager, external network host configuration protocol, or other external entity) may provide different types or amounts of network configuration-related information. Regardless of the types of amounts of network configuration-related information provided to the NMC 118 by the external sources, the NMC 118 (e.g., employing the network configuration report generator component 206) can convert such network configuration-related information to the desired format for the network configuration report. Also, it is noted that, in some embodiments, if an NMC of or associated with a node does not receive any network configuration-related information (e.g., network address information or other information) from a communication device (e.g., 124) or other entity associated with an external network host configuration protocol (e.g., 120), because there are no network addresses associated with that node or for any other reason, the NMC of or associated with that node may not generate a network configuration report associated with an external network host configuration protocol with respect to that node. In certain embodiments, the NMC 118 also can check or determine (e.g., automatically, periodically, or dynamically check or determine) whether there are any changes to or from the system 100. For instance, the NMC 118 (e.g., employing the network configuration report generator component 206) can determine the set of supported or enabled external managers, as, for example, not all clusters of nodes will run in the cloud and/or a certain external manager may not be supported or enabled for another reason.

The respective NMCs (e.g., 118*a*, 118*b*, and/or 118*c*) of or associated with the respective nodes (e.g., 102, 104, and/or 106) can store (e.g., can communicate and store) the respective network configuration reports (e.g., 408, 410, and/or 412) associated with the external network host configuration protocol (e.g., 120) and the respective nodes in a data store (e.g., a centralized data store of or associated with the file system of the node network 108), such as the data store 302, of or associated with a node (e.g., 102).

With further regard to interactions between external managers and the NMC 118 (e.g., employing the network configuration learner component 204 or network configuration report generator component 206), each external manager can implement an application programming interface (API) and/or contract that can be defined by the NMC 118. In some embodiments, the NMC 118 may not contain external manager specific code, and can instead delegate the specifics to the individual managers. This contract can be defined by certain pieces of information that can be provided to the NMC 118. Such certain pieces of information can include, for example, a name of the external manager as it can be desirable for the NMC 118 to know what the external manager is called and what directory to create with respect to the external manager; whether the external manager is enabled or supported, so that the NMC 118 can know whether network configuration reports can even be generated for a particular external manager; and what the network configuration report associated with the external manager is, as this can provide an indication of the method to retrieve the network configuration report associated with the external manager. Accordingly, in some embodiments, the NMC 118 can employ certain structs, with respect to each individual external manager, that can include the name of the external manager, which can be its source (e.g., SLAAC), and, as desired, this also can be used as the directory in the shared storage with respect to the external manager. There also can be a struct for the network configuration report associated with the external manager and node.

In certain embodiments, the above certain struct definitions can be divided into two portions to reduce the amount of duplicated configuration/logic between the network configuration report generator component 206 and the merger component 208. This can allow for a central definition of the name of the external manager and enablement checks, while providing desirable separation of concerns for merging and network configuration reporting. In some embodiments, the NMC 118 can be implemented such that none of this code or logic has to be duplicated, since only the network configuration report generator component 206 has to know the network configuration associated with the external manager.

It yet other embodiments, the node network 108 can allow or enable integration of an external network configuration associated with an external manager and protocol with the node network 108, where the network configuration learner component 204 and/or network configuration report generator component 206 can be bypassed, or, at least in effect, can be bypassed, if the external manager can handle (e.g., is capable of performing) the integration of the external network configuration with the node network 108 (e.g., external manager is capable of creating the directory associated with the external manager and protocol in the shared storage of the file system, and is capable of creating a network configuration report) such that the merger component 208 is able to utilize the network configuration report file created by the external manager when performing the merger process. If the external manager is capable of handling the integration (and is authorized by the node network 108 to do so), the external manager can create or establish the directory associated with the external manager and protocol in the shared storage of the file system of the node network 108, can create a network configuration report file associated with the external network host configuration protocol and the node in the desired format (e.g., XML, or another desired and/or agnostic format), and can store the network configuration report file in the directory of the shared storage.

With further regard to network configuration reports, in some embodiments, the NMC 118 (e.g., employing the network configuration learner component 204 or network configuration report generator component 206) can step through each external manager to request a new network configuration report. If there are no changes in the new network configuration report relative to (e.g., as compared to) the previous network configuration report with respect to an external manager and associated with external network host configuration protocol, the network configuration report generator component 206 can decide to not write out any updates regarding the network configuration report with respect to that external manager and can discard the newly generated network configuration report. As disclosed, if the external manager reports no network addresses, the network configuration report generator component 206 can bypass writing out a network configuration report with respect to that external manager. This can be done, for example, to handle the case of not all nodes on network (NANON) clusters of nodes with respect to certain types of protocols (e.g., SLAAC protocol), wherein NANON can refer to a cluster configuration where some nodes are not connected to the front end network.

With regard to the merging process that can be employed by the NMC 118, in certain embodiments, the node network 108 (e.g., a cluster of nodes of the node network 108) can employ an internal network configuration (INT. NW CONFIG.) 128 (e.g., an internal, local, or centralized network configuration) that can be determined or implemented based at least in part on an internal network configuration protocol (INT. PROTOCOL) 130 (e.g., an internal, local, or centralized network configuration protocol). The internal network configuration can be an administrator-defined (e.g., administrator configured) network configuration, for example. A first group of network addresses ($1^{ST}$ GROUP OF NW ADD.) 132 associated with the internal network configuration 128 can be managed (e.g., internally or locally managed) by the NMC 118 based at least in part on the internal network configuration 128 associated with the node network 108 and in accordance with the internal network configuration protocol 130. It also can be desirable to enable certain network addresses (e.g., a second group of network addresses ($2^{ND}$ GROUP OF NW ADD.) 134) to be externally managed by an external manager, such as, for example, external manager (EXT. MGR.) 136 (e.g., an external manager component, such as a server or other communication and/or computing device, associated with an external system of or associated with the communication device 124) that can be external to the node network 108. In accordance with various embodiments, the NMC 118 can comprise and employ a merger component 208 (e.g., employing the network configuration merger function) that can desirably (e.g., suitably, efficiently, enhancedly, or optimally) merge or integrate network addresses (e.g., the second group of network addresses 134) and/or other network features, which can be externally managed by the external manager (e.g., 136) in accordance with an external network host configuration protocol (e.g., 120 or 122), with the network addresses (e.g., the first group of network addresses 132) of the node network 108 that can be managed (e.g., internally or centrally managed) by the NMC 118 (e.g., a master or coordinator NMC of the node network 108), in accordance with the internal network configuration protocol 130. The merger component 208 can employ the network configuration merger function that can implement a desired merging process that can be coordinated among or between the nodes of the node network 108 to facilitate mitigating (e.g., avoiding, preventing, or minimizing) conflicts between the nodes (e.g., 102, 104, and/or 106) and mitigating the impact of scalability, which can enable desirable scalability of the merging or integration of network addresses (e.g., the second group of network addresses 134) externally managed using one or more external network host configuration protocols (e.g., 120 and/or 122) with network addresses (e.g., the first group of network addresses 132) internally managed using the internal network configuration protocol 130.

In accordance with various embodiments, the other NMCs of the other nodes of the node network 108 also can possess the capabilities and functionality to serve as a master or coordinator NMC of the node network 108. If the NMC acting as a master or coordinator NMC of the node network 108 has a failover event or otherwise is unable to serve as the master or coordinator NMC and perform the merging process, another NMC of the node network 108 can take over and serve (e.g., can automatically or dynamically take over and serve) as the master or coordinator NMC for the network of nodes 108, and can perform the merging process and achieve or generate the same or similar results as would have been achieved or generated by the prior master or coordinator NMC had the prior master or coordinator NMC been functioning properly and performed the merging process.

With further regard to the merging process, in some embodiments, as part of the merging process, the NMC 118 (e.g., NMC 118, such as NMC 118a), which can act or function as the master or coordinator NMC for the node network 108, can retrieve (e.g., read or obtain) the respective network configuration reports (e.g., 408, 410, and/or 412) associated with the external network host configuration protocol (e.g., 120) and the respective nodes (e.g., 102, 104, and/or 106) from the data store 302. The NMC 118, employing the merger component 208, can analyze the respective network configuration information of the respective network configuration reports associated with the external network host configuration protocol (e.g., 120) and the respective nodes (e.g., 102, 104, and/or 106). Based at least in part on the results of such analysis of the respective network configuration reports (e.g., 408, 410, and/or 412), the merger component 208 can determine and generate (e.g., create) an externally managed network configuration (EXT. NW CONFIG.) 138 associated with the external network host configuration protocol (e.g., 120) that can be utilized to merge or integrate the network addresses (e.g., network addresses, and/or other network-related features or properties, as learned and identified in the network configuration reports) that are to be externally managed by or using the external network host configuration protocol (e.g., protocol 120 by the external manager 136) with or into the node network 108, which also can employ the internal network configuration 128 (e.g., internal, local, or centralized network configuration) of the node network 108, in accordance with the internal network configuration protocol 130 (e.g., internal, local, or centralized network configuration protocol), as indicated at reference numeral 414 of the network configuration flow process 400.

For instance, based at least in part on the results of such analysis of the respective network configuration reports (e.g., 408, 410, and/or 412), the merger component 208 can determine and generate the externally managed network configuration 138 (or can copy an already existing network configuration, if such a network configuration is determined to already exist) that can relate to the second group of network addresses 134 (e.g., a group comprising one or more network addresses) that is to be externally managed by the external manager (e.g., 136) associated with the external network host configuration protocol (e.g., 120) and/or communication device (e.g., 124). The externally managed network configuration 138 can relate to, indicate, or specify, for example, one or more network addresses (e.g., the second group of network addresses 134), a gateway, a netmask, one or more network interfaces (e.g., one or more identifiers of one or more network interfaces of the nodes of the node network 108), an MTU, a DNS configuration, a VLAN tag, and/or other characteristics (e.g., parameters, features, attributes, or properties) of the externally managed network configuration 138. The merger component 208 can determine and generate a network configuration file, in a desired format (e.g., a desired compatible or agnostic file or data format) that can comprise network configuration information relating to, indicating, or specifying the externally managed network configuration 138 associated with the external network host configuration protocol (e.g., 120). The externally managed network configuration 138 can comprise or relate to one or more subnets, one or more network pools respectively associated with the one or more subnets (e.g., comprising or relating to a gateway, netmask, MTU, and/or other characteristic), one or more network addresses respectively associated with the one or more network pools, one or more interfaces respectively associated with the one or more network pools, and/or other characteristics of the externally managed network configuration 138, as determined by the merger component 208 based at least in part on the results of the analysis of the one or more network configuration reports (e.g., 408, 410, and/or 412).

In accordance with various embodiments, to facilitate determining and generating the externally managed network configuration 138, and associated network addresses (e.g., the second group of network addresses 134), associated with the external network host configuration protocol (e.g., 120), the merger component 208 can pre-process external network pools, if any exist, for the external manager 136 associated with the external network host configuration protocol (e.g., 120) that is being handled by the merger component 208 at that time. In some embodiments, as part of the pre-processing of the external network pools, the merger component 208 can identify or determine all networks (e.g., externally managed networks), if any exist, configured by this external network host configuration protocol (e.g., 120), and can clear or remove all network addresses and interfaces from each such network(s). At this point, the merger component 208 may not save out this configuration in this state. The clearing of the existing network addresses and interfaces can be performed by the merger component 208 to basically perform a reset before the merger component 208 applies the network configuration reports to the network configuration. A reason for this can be to ensure that, if a node is removed from the node network 108 (e.g., the cluster of nodes of the node network 108), the merger component 208 can remove that node from any externally managed network pools. After clearing the network addresses and interfaces from each network(s), the merger component 208 can retrieve (e.g., read, load, or obtain) the respective network configuration reports (e.g., 408, 410, and/or 412) associated with the external network host configuration protocol (e.g., 120) and the respective nodes (e.g., 102, 104, and/or 106) from the data store 302.

In certain embodiments, the merger component 208 can iterate over and analyze each of the respective network configuration reports (e.g., each of the respective network addresses identified in the respective network configuration reports (e.g., 408, 410, and/or 412)) and/or the respective network pools individually. Based at least in part on the results of such analysis (e.g., with regard to each network configuration report) and/or analysis of the centralized network configuration (e.g., 130) of the node network 108, the merger component 208 can determine whether a subnet (e.g., a matching subnet) already exists (e.g., as part of the centralized network configuration) for the network address(es) associated with the network configuration indicated or specified in the network configuration report, and/or can determine whether there is any change to a network pool (e.g., any change to a pool member(s) of a network pool, if such network pool already exists).

The merger component 208 can determine that a subnet already exists (e.g., as part of the centralized network configuration) for the network address(es) associated with the network configuration indicated or specified in the network configuration report, if the subnet satisfies defined matching criteria with respect to a subnet indicated or specified in the network configuration indicated or specified in the network configuration report, wherein the defined matching criteria can indicate or specify a first group of characteristics (e.g., characteristics, such as gateway, netmask, MTU, and/or other characteristic(s)) of a first subnet (e.g., subnet that is part of the centralized network configuration) that have to match a second group of characteristics of a second subnet (e.g., as indicated or specified in the network configuration indicated or specified in the network configuration report) in order to satisfy the defined matching criteria and qualify the first subnet as being a match to the second subnet.

If the merger component 208 determines (e.g., with regard to each network configuration report) that a subnet (e.g., a matching subnet) does not already exist (e.g., as part of the centralized network configuration (e.g., 130)) for the network address(es) associated with the network configuration of the network configuration report, the merger component 208 can generate (e.g., create) a new subnet based at least in part on the network configuration information contained in the network configuration report (e.g., 408, 410, or 412) associated with the node (e.g., 102, 104, or 106) under consideration, wherein the new subnet can comprise the characteristics or parameter values indicated or specified in the network configuration report. If, instead, the merger component 208 determines that a subnet already exists (e.g., as part of the centralized network configuration), because such subnet satisfies the defined matching criteria with respect to the characteristics of the subnet indicated, specified, or desired in or by the network configuration indicated or specified in the network configuration report, the merger component 208 can determine that the already existing subnet can be utilized and/or copied to be utilized as the subnet for the network configuration associated with the network configuration report. With regard to one or more respective network address associated with or indicated by the subnet, the merger component 208 can determine, generate, and/or define a network address mapping that can indicate, specify, or map respective network addresses (e.g., respective live network addresses) to be associated with or mapped to (e.g., linked to) respective interfaces associated with the node network 108 (e.g., respective interfaces of the respective nodes of the node network 108), in accordance with the network configuration report. The merger component 208 can save (e.g., store) any information relating to such merging and network configuration (e.g., in the network configuration file associated with the external network host configuration protocol (e.g., 120)).

In certain embodiments, with regard to network pools, if the merger component 208 determines that there is a change to a network pool (e.g., any change to a pool member(s) of a network pool, if such network pool already exists), the merger component 208 can identify such change to the network pool, and can save (e.g., store) any change (e.g., change to a network address or other characteristic or parameter value) to that network pool (e.g., in the network configuration file associated with the external network host configuration protocol (e.g., 120)) and/or the node associated with the network configuration report under evaluation.

As a non-limiting example of the network configuration process associated with an external network host configuration protocol, such as a DHCP, the network configuration learner component (e.g., 204) of the NMC 118b of the node 104 can communicate with the external manager (e.g., 136) employing the external network host configuration protocol to obtain desired and available network configuration-related information, in response to a request, a connection of the communication device (e.g., 124) to the node network 108, and/or another type of event. The external manager (e.g., employing a DHCP lease component (not shown)) can communicate the network configuration-related information, comprising, for example, network address: 1.2.3.4, gateway: 2.3.4.5, netmask: 255.255.255.0, and/or other network configuration-related information, to the node 104 (e.g., the network configuration learner component of the node). The network configuration report generator component (e.g., 206) of the NMC 118b can generate a network configuration report (e.g., 410) based at least in part on the network configuration-related information, wherein the network configuration report can include network configuration information comprising, indicating, or specifying the network address: 1.2.3.4, the interface: em0, the gateway: 2.3.4.5, the netmask: 255.255.255.0, and/or the other network configuration-related information (e.g., node identifier, identifier associated with the external network host configuration protocol, operational capability information associated with the protocol, and/or other desired information), such as described herein. The network configuration report generator component (e.g., 206) of the NMC 118b can store the network configuration report in the data store 302 of the node 102.

While iterating over the network configuration reports associated with the external network host configuration protocol, the merger component (e.g., 208) of the NMC 118a of the node 102 can retrieve the network configuration report (e.g., 410) from the data store 302. The merger component can analyze the network configuration report, and can compare the network configuration information in the report to the subnet(s) and/or network pool(s) that already exist for the node network 108 to facilitate determining whether a subnet of the node network 108 already exists that matches (e.g., satisfies defined match criteria) at least certain characteristics (e.g., base network address, gateway, and/or another desired characteristic or parameter) contained in the network configuration information in the report. If the merger component determines that there is an existing subnet of the node network 108 that matches at least certain characteristics, such as, for example, a base network address, a gateway, and/or another desired characteristic (e.g., base network address of 1.2.3.0, the gateway: 2.3.4.5, and/or another desired characteristic or parameter) contained in the network configuration information in the report, the merger component can copy such existing subnet (e.g., copy all or a desired portion of the subnet information of the existing subnet, such as the subnet information that is determined to match the certain characteristics) and/or modify such existing subnet so that the resulting subnet comprises the characteristics contained in the network configuration information in the report. If, instead, the merger component determines that there is no existing subnet that matches at least the certain characteristics contained in the network configuration information in the report, the merger component can generate (e.g., create) a subnet that comprises the characteristics contained in the network configuration information in the report. Alternatively, in other embodiments, the merger component can generate a subnet that comprises the characteristics contained in the network configuration information in the report, without checking to determine whether such a subnet already exists.

In some instances, a subnet may be missing, but the implementation does not support creating subnets or the merger component (e.g., 208) is otherwise unable to generate a desired subnet for some reason. In some embodiments, during a merger process, if the merger component (e.g., 208) determines that a subnet is missing, but the implementation does not support creating subnets or the merger component is otherwise unable to generate a desired subnet for any reason, the merger component can determine that the administrator is to be notified, and the merger component can notify the administrator that the desired subnet was not able to be created. The administrator can take desired (e.g., appropriate or suitable) action to address the situation (e.g., manually create or define the desired subnet, or take other appropriate action).

After the desired subnet has been generated (e.g., created, copied, partially copied and/or modified, or otherwise generated), the merger component (e.g., 208) also can determine and/or generate a network pool that can be associated with the subnet associated with (e.g., that is based at least in part on) the network configuration report based at least in part on the network configuration information of the network configuration report. In some embodiments, if the merger component determines that such a network pool that matches already exists, or an existing network pool substantially matches the network configuration information and can be adapted (e.g., modified or changed) to generate the network pool, the merger component can copy the existing network pool or can adapt the existing network pool (e.g., adapt or change network pool information of a copy of the existing network pool) to create a desired network pool that can comprise characteristics contained in or corresponding to the network configuration information in the network configuration report. For instance, the merger component can determine, generate, and/or adapt a network pool to comprise network pool information comprising an allocation method that indicates the network pool (e.g., one or more network addresses indicated or specified by the network pool) is externally managed by the external manager and/or the external network host configuration protocol, one or more network addresses, one or more interfaces, a DNS configuration, and/or other network configuration associated with (e.g., indicated or specified by) the network configuration information of the network configuration report.

The merger component (e.g., 208) further can determine, define, generate, and/or adapt a mapping of network addresses and interfaces (e.g., a mapping, linking, or association of respective network addresses to respective interfaces) of the node network 108 (e.g., node 104 of the node network 108) based at least in part on the network configuration information of the network configuration report, wherein the mapping can be associated with the externally managed network pool. For instance, the mapping can indicate which network addresses live on or are associated with which interfaces of the network pool. The mapping of respective network addresses to respective interfaces of the node network 108 can indicate, specify, or identify the allocation method as externally managed (e.g., external manager, DHCP, SLAAC, or other identifier that indicates that the network pool is externally managed by an external manager), one or more network addresses of the network pool, one or more interfaces of the node network 108 that can be part of the network pool, a DNS configuration associated with the network pool, and/or other elements (e.g., features, components, parameters, or properties) of or associated with the network pool.

In some embodiments, with regard to each externally managed network pool, the merger component (e.g., 208) can analyze the network configuration information relating to the network addresses from the network configuration report and can create (e.g., generate) a mapping of respective network addresses to respective interfaces based at least in part on (e.g., in accordance with, or corresponding to) the results of analyzing the network configuration information from the network configuration report. The merger component can compare the newly created mapping of respective network addresses to respective interfaces to an existing mapping of respective network addresses to respective interfaces (if any such mapping exists). If, based at least in part on the results of the comparison, the merger component determines there is no existing mapping of respective network addresses to respective interfaces that satisfies a defined match criterion with respect to (e.g., that matches or is same as) the newly created mapping of respective network addresses to respective interfaces, the merger component can write out or facilitate writing out the newly created mapping of respective network addresses to respective interfaces to shared storage (e.g., data store 302 and/or other data store) of the node network 108. If, instead, based at least in part on the results of the comparison, the merger component determines there is an existing mapping of respective network addresses to respective interfaces that satisfies the defined match criterion with respect to (e.g., that matches or is same as) the newly created mapping of respective network addresses to respective interfaces, the merger component can determine that the existing mapping of respective network addresses to respective interfaces can continue to be utilized by the node network 108, and the merger component can discard (e.g., delete, erase, or otherwise discard) the newly created mapping of respective network addresses to respective interfaces, since the (matching) existing mapping of respective network addresses to respective interfaces is already in place.

In other embodiments, the merger component (e.g., 208) can utilize the newly created mapping of respective network addresses to respective interfaces without regard to whether there is an existing mapping of respective network addresses to respective interfaces that matches (e.g., satisfies the defined match criterion) the newly created mapping of respective network addresses to respective interfaces and/or without checking to determine whether there is an existing mapping of respective network addresses to respective interfaces that matches the newly created mapping of respective network addresses to respective interfaces.

The merger component (e.g., 208) can store subnet information relating to the subnet, network pool information relating to the network pool, mapping information relating to the mapping, and/or other desired network configuration information associated with the network configuration report in shared storage of the file system of the node network 108, which can comprise the data store 302 or other desired storage location of or associated with one or more of the nodes (e.g., 102, 104, and/or 106).

The merger component (e.g., 208) can iterate over any other network configuration reports associated with any other nodes and the external network host configuration protocol until the network configuration associated with the external network host configuration protocol is merged with the internal (e.g., centralized) network configuration of the node network 108.

If there is more than one external network host configuration protocol, with regard to each other external network host configuration protocol (e.g., 122), the NMCs (e.g., 118a, 118b, 118c, and/or 118d) can respectively perform the network configuration learner functions, network configuration reporter functions, and network configuration merger function to create an externally managed network configuration (e.g., 140) relating to another group of network addresses (e.g., a third group of network addresses ($3^{RD}$ GROUP OF NW ADD.) 142) that can be externally managed by an external manager (e.g., 144), in accordance with the other external network host configuration protocol (e.g., 122).

The network configuration learner component 204, the network configuration report generator component 206, and the merger component 208, and the NMC 118 overall, can be designed or structured such that those components do not have to be undesirably complex, and can be desirably (e.g., suitably or optimally) deterministic. The system 100, employing the NMCs (e.g., 118a, 118b, 118c, and/or 118d), including such components (e.g., 204, 206, and 208), can logically separate the administrator-defined networks (e.g., the internally managed network that can be structured or created based at least in part on the internal network configuration 128 of the node network 108) from externally managed networks (e.g., the externally managed network that can be structured or created based at least in part on the external network configuration(s) 138 and/or 140 of the node network 108) that can be managed by the external network host configuration protocols (e.g., 120 and/or 122). If the system 100 (e.g., the cluster of nodes (e.g., 102, 104, and/or 106) of the node network 108) configures the network at a subnet level, the internally managed network(s) and the externally managed network(s) can operate on respective (e.g., different) subnets that can be logically separated from each other; and if the system 100 configures the network at a more granular level (e.g., at a network pool level, or other level that is more granular than the subnet level), the internally managed network(s) and the externally managed network(s) can operate on respective (e.g., different) network pools (or can operate on other respective network elements that can be more granular than the subnet level) that can be logically separated from each other. Regardless of the granular level of configuration of the network, the system 100 can configure the network elements (e.g., subnets, network pools, or other type of network elements) in a deterministic way to desirably distinguish between administrator-defined networks (e.g., internally managed networks) and externally managed networks.

In some embodiments, the NMC 118 can comprise an implementation component 210 that can implement (e.g., utilize, apply, or otherwise implement), manage, or facilitate managing network configurations, and respectively associated network addresses, associated with the node network 108, including the internally managed network configuration 128 and first group of network addresses 132 of the node network 108 and one or more externally managed network configurations (e.g., 138 and/or 140), and one or more externally managed groups of network addresses (e.g., 134 and/or 142), associated with one or more external network host configuration protocols (e.g., 120 and/or 122). Employing the network configurations (e.g., 128, 138, and/or 140), the NMC 118 can manage or facilitate managing connections (e.g., communication connections or channels) of client devices (e.g., 110 and/or 114) to respective network addresses and associated interfaces of the node network 108 and the communication of information between the client devices and the nodes of the node network 108 via those connections, wherein the internally managed network addresses (e.g., first group of network addresses 132) can be managed by the NMC 118 (e.g., as internal manager) and one or more externally managed groups of network addresses (e.g., 134 and/or 142) can be externally managed by the one or more external managers (e.g., 136 and/or 144).

In some embodiments, the internally managed network configuration 128 and first group of network addresses 132 of the node network 108 and the one or more externally managed network configurations (e.g., 138 and/or 140), and the one or more externally managed groups of network addresses (e.g., 134 and/or 142), associated with the one or more external network host configuration protocols (e.g., 120 and/or 122) can be utilized concurrently, simultaneously, and/or in parallel, and/or can operate independently of each other.

In certain embodiments, the NMC 118 can employ a monitor component 212 that can monitor for any changes to the network configuration reports due to, for example, a change (e.g., modification or update) to a node, a removal or loss of operation (e.g., a fault or failure) of a node of the node network 108, an addition or resuming of operation of a node to the node network 108, a change (e.g., modification or update) to an external network host configuration protocol (e.g., 120), a change in the network addresses to be externally managed by the external manager (e.g., 136), or any other change that can result in a change to one or more network configuration reports (e.g., removal, addition, or modification to a network configuration report(s)). If, based at least in part on such monitoring, the monitor component 212 detects any change to one or more network configuration reports, the monitor component 212 can communicate information indicating that a change to the network configuration reports has been detected to the merger component 208. For example, if a node (e.g., node 106) experiences a failure, the monitor component 212 can detect that failure and/or detect or determine that the network configuration report associated with that failed node is no longer available (e.g., due to a garbage collection operation or for another reason) or no longer viable or valid.

In response to learning that the change to the network configuration reports has been detected, the merger component 208 can trigger the merge process and the merger component can perform the network configuration merger function, such as described herein. For instance, in some embodiments, in response to learning that the change to the network configuration reports has been detected, the merger component 208 can perform the network configuration merger function to create a new externally managed network configuration relating to a group of network addresses to be externally managed by the external manager (e.g., 136), based at least in part on the network configuration information in the current or most recent network configuration reports, in accordance with the external network host configuration protocol (e.g., 120), and merging that externally managed network configuration with the internally managed network configuration 128 relating to the first group of network addresses 132 internally managed by the NMC 118. In effect, the merger component 208 can perform the merging process anew using the current or most recent network configuration reports. For example, with regard to the example of the failed node, when the merger component 208 performs the merging process, the merger component 208 can determine that the failed node and associated network configuration report are not to be included in the merging process, as there will no longer be any reference to that node (e.g., there will no longer be a network configuration report (e.g., a viable or valid report) associated with that node).

As disclosed, during the pre-processing operations of the merger process, the merger component (e.g., 208) can remove all of the network addresses and interfaces from a network pool, and can re-add desired network addresses and interfaces to the network pool, in accordance with the network configuration reports being processed during the merger process. A reason can be that it may be difficult to detect that something is missing with regard to a network configuration, and it can be relatively easier and/or more suitable or efficient to remove all of the network addresses and interfaces from the network pool, and re-add desired network addresses and interfaces to the network pool, as this can involve (e.g., demand or require) significantly less state tracking within the merger component.

As another example, if there is a change such that a node (e.g., node 106) no longer has any network addresses from the external network host configuration protocol (e.g., 120), the network configuration report generator component 206 can stop (e.g., cease) reporting those (previously reported) network addresses. During performing of the merging process, the merger component 208 can discontinue or drop those network addresses associated with that node from the node network 108 (e.g., from the overall configuration of the node network 108).

In other embodiments, instead of performing the merging process completely anew, in response to learning that the change to the network configuration reports has been detected, the merger component 208 can perform the network configuration merger function to make changes (e.g., modifications or adjustments) to any portion of the externally managed network configuration and related externally managed group of network addresses that are determined to be desirable (e.g., wanted, suitable, or necessitated) by the one or more changes to one or more network configuration reports.

In certain embodiments, as part of or in association with the merger component 208, the NMC 118 can comprise a garbage collector component 214 that can perform a desired garbage collection process on the network configuration reports stored in the data store 302 and/or stored at the nodes (e.g., 102, 104, and/or 106) to remove or delete any invalid, outdated, or otherwise undesirable network configuration reports from the data store 302 and/or other storage at the nodes. For example, if a node (e.g., 106) is removed from the cluster of nodes (e.g., removed from the node network 108) or fails (e.g., suffers a catastrophic failure), the garbage collector component 214 can remove or delete the network configuration report associated with that node from the shared storage or database of the file system of the node network 108 (e.g., the shared storage or database can comprise or involve the respective data stores (e.g., 302) of one or more of the respective nodes of the node network 108 and/or other data storage at any of the respective nodes).

Figure 6:
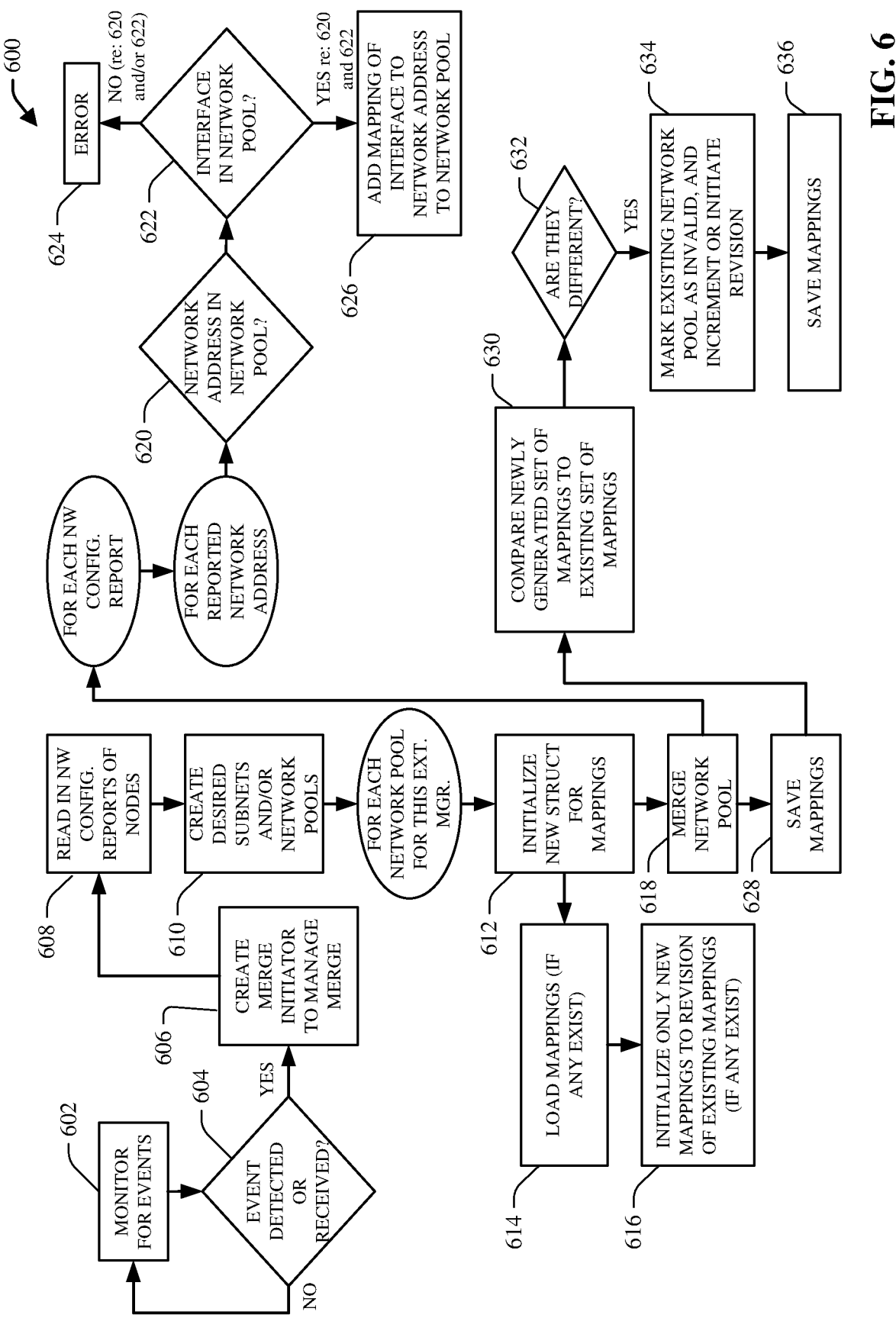
FIG. 6 depicts a block diagram of a non-limiting example merging process that can be employed by a merger component or other component(s) of the NMC to facilitate merging an externally managed network configuration and related externally managed network addresses with an internally managed network configuration and related network addresses associated with a node network, in accordance with various aspects and embodiments of the disclosed subject matter.

Referring to FIG. 6 (along with FIGS. 1-3), FIG. 6 depicts a block diagram of a non-limiting example merging process 600 that can be employed by the merger component 208 or other component(s) of the NMC 118 of a node (e.g., node 102) to facilitate merging an externally managed network configuration and related externally managed network addresses with an internally managed network configuration and related network addresses associated with a node network, in accordance with various aspects and embodiments of the disclosed subject matter. At 602 of the example merging process 600, the NMC 118 can monitor for events associated with the network of nodes 108 that can trigger the merging process with respect to an external network host configuration protocol (e.g., 120). At 604, the NMC 118 can determine whether an event has been detected or received. If no event has been detected or received, the merging process 600 can return to reference numeral 602 to continue monitoring for events.

If, instead, at 604, the NMC 118 determines that an event is detected or received, at 606, the NMC 118 can create a merging initiator (e.g., a spark, indicator, or instruction to initiate the merging process or indicate the merging process is to be performed). At 608, the NMC 118 can read, from the data store 302, the network configuration reports (NW CONFIG. REPORTS) associated with the external network host configuration protocol (e.g., 120) and the nodes of the network of nodes 108. At 610, the NMC 118 can create desired subnets and/or network pools based at least in part on analysis of the respective network configuration information contained in the respective network configuration reports.

At 612, with regard to each network pool associated with the external manager (e.g., 136) associated with the external network host configuration protocol (e.g., 120), the NMC 118 can initialize a new struct for the mappings of interfaces to network addresses of the network pool under consideration. At 614, the NMC 118 can load existing mappings of interfaces to network addresses (e.g., existing pool members of the network pool), if any exist. In some embodiments, at 616, the NMC 118 can (e.g., optionally can) initialize only new mappings of interfaces to network addresses (e.g., new network pool members) to the revision of the existing mappings of interfaces to network addresses (if any existed) (e.g., the NMC can initialize only new mappings of interfaces to network addresses that are to be added to revise the network pool that already includes existing mappings of interfaces to network addresses (if any existed)).

At 618, with regard to each network pool associated with the external manager (e.g., 136) associated with the external network host configuration protocol (e.g., 120), the NMC 118 can merge the network pool. In that regard, with regard to each network configuration report, and for each network address reported in each network configuration report, at 620 and 622, the NMC 118 can determine whether the network address under consideration is in the network pool and can determine whether the interface under consideration is in the network pool. If the NMC 118 determines that the network address under consideration is not in the network pool under consideration and/or the interface under consideration is not in the network pool under consideration, at 624, the NMC 118 can return an error message. If, instead, the NMC determines that the network address under consideration and the interface under consideration are in the network pool under consideration, at 626, the NMC 118 can add a mapping of the interface to the network address to the network pool.

At 628, with regard to each network pool associated with the external manager (e.g., 136) associated with the external network host configuration protocol (e.g., 120), the NMC 118 can save the mappings of interfaces to network addresses. In connection with (e.g., as part of) saving the mappings of interfaces to network addresses, at 630, the NMC 118 can compare newly generated set of mappings of interfaces to network addresses to the existing set of mappings of interfaces to network addresses for the network pool under consideration. At 632, the NMC 118 can determine whether the newly generated set of mappings of interfaces to network addresses is different from the existing set of mappings of interfaces to network addresses. If the newly generated mapping set is different from the existing mapping set, at 634, the NMC 118 can mark the existing network pool with the existing pool members as invalid or otherwise out of date, and can increment or initiate revision of the existing network pool to include the new mappings of interfaces to network addresses. At 636, the NMC 118 can save the mappings of interfaces to network addresses, including the new mappings of interfaces to network addresses, to the network pool. The NMC 118 can write out the updates (e.g., updated network pool and/or updated mapping of interfaces to network addresses) to the file system of the network of nodes 108, and, at this point, the merge process can be complete for that network pool under consideration.

In certain embodiments, if, instead, the NMC 118 determines that the newly generated mapping set is the same as the existing mapping set, the NMC 118 can determine that the existing mapping set can continue to be utilized, and the newly generated mapping set does not have to be written to the file system of the network of nodes 108, and the merge process can be complete for that network pool under consideration.

With further regard to the merging process, as disclosed, in some embodiments, one node (e.g., 102) of the node network 108 (e.g., one NMC 118a of one node 102 of the node network 108) can be responsible for performing the merging process at a particular time (e.g., the NMC of a node can run and manage the merging process). In certain embodiments, the instance of the driver (e.g., a daemon of or associated with the merger component 208) that is performing the merger process does not have to be tied to any particular node, but instead, can be coordinated, for example, by an exclusive file lock on the file system of the node network 108. The NMC 118 can tie the merging process to having the lock on that file, so that only one node can perform the merging process at the particular time. The node (e.g., 102) that has the merge and/or file lock can maintain possession of the lock for the life of the merging process. However, as disclosed, if for some reason, the node (e.g., 102) fails or becomes unavailable or inoperable, another node (e.g., 104 or 106) can have an opportunity to take possession of the merge and/or file lock (e.g., exclusive lock) (or a newly generated merge and/or file lock for that other node), and can become the new driver (e.g., employing the NMC of such other node) of the merging process.

With further regard to triggering of the merging process, the merger component 208 can be desirably (e.g., suitably, enhancedly, or optimally) reactive to when nodes (e.g., 102, 104, and/or 106) update one or more of the respective network configuration reports associated with the respective nodes and an external network host configuration protocol (e.g., 120). Accordingly, the merger component 208, employing the monitor component 212, can have the monitor component 212 monitor the external directories for one or more changes to one or more of the network configuration reports, which can cause the merger component 208 to trigger the merging process to merge the respective network configuration files associated with the respective nodes and an external network host configuration protocol (e.g., 120). There can be a directory per external manager (e.g., 120 and/or 144). In some embodiments, in order to facilitate monitoring of the respective external directories associated with the respective external managers, the monitor component 212 can be provided with a file descriptor for the external directory it is tasked with monitoring. For example, in the case of the cloud, the directory path can comprise a descriptor that relates to or indicates cloud is the external manager. The merger component 208 and/or monitor component 212 can employ a desired data structure that can be utilized to facilitate enabling the merger component 208 and/or monitor component 212 to know what the names of the external directories to be monitored are.

Once an event (e.g., a change in a network configuration report or other triggering event) triggering the merging process is detected based at least in part on the monitoring, the merger component 208 can call the desired callback (e.g., LoadAll) to read or load all of the network configuration reports associated with the respective nodes and the external manager (and associated external network host configuration protocol), such as described herein. In some embodiments, within this callback, the merger component 208 can implement upserting with regard to pre-processing external network pools and merging logic, such as described herein. Upserting can comprise updating or inserting a record or data (e.g., updating or modifying an existing record or data, or inserting or creating a new record or data).

With further regard to merging external network addresses, the merger component 208 can merge the external network configuration-related information, including the network addresses (e.g., externally managed network addresses), associated with an external network host configuration protocol (e.g., 120) into or with the internal (e.g., internal or centralized) network configuration (e.g., which is stored on the file system of the node network 108) utilizing the following logic, for example: pre-process external network pools for the particular external manager (e.g., 136), load (e.g., read) all of the respective network configuration reports associated with the respective nodes (e.g., 102, 104, and/or 106) and the external manager, iterate over each network pool identified in the respective network configuration individually, if there are changes to a network pool member(s) of or associated with a network pool (for each network pool), save such changes to the network pool member(s) to the file system, and handle errors (if any error exists). The merger component 208 can follow and perform these operations for each network address externally managed by a particular external manager (e.g., 136). As this process can be on a per-external source basis, the merger component 208 can operate on the assumption that the external source is known. Additionally, in some embodiments, the merging process can be entirely source-agnostic, such as described herein. A goal can be to only write out the network pool members file of each externally managed network pool once (a goal which can be achieved by the merger component 208), and, likewise, the merger component 208 can process each node-specific network configuration report once per merging process.

In certain embodiments, the merger component 208 can employ non-limiting pseudocode for a merge algorithm for performing the merging process as follows:

```
all_network addresses = collection of all network_configuration_reports
For each externally managed network pool with an external manager:
   interface-to-network address_mappings = new struct
   interface-to-network
address_mappings
   original_mapping = existing_interface-to-network
   address_mappings saved on file
system, if exists
   network pool_mapping = interface-to-network
   address_mappings->_mappings
For each network_configuration_report in all_network addresses:
   For each network_address in a network_configuration_report:
      if network_address is NOT in current network pool:
         continue;
      interface_identifier = network addresses interface_identifier
      network address_set = existing_interface-to-network
      address_mappings_find(network pool_mapping, interface_identifier)
      if network address_set == NULL:
         network address_set = new network address_set
      else:
         existing_interface-to-network
         address_mappings_remove(network
         pool_mapping, interface_identifier)
      network address_set_add(network address_set, network_address)
         existing_interface-to-network address_mappings_add(network
         pool_mapping, interface_identifier, network address_set)
      remove network_address from network_configuration_report
```

```
if network pool_mapping != original_mapping, write
out updated interface-to-
network address_mappings to file system.
```

With further regard to pre-processing external network pools, in some embodiments, the merger component 208 can perform certain tasks as part of pre-processing of external network pools and/or subnets, with those tasks including updating permission flags (e.g., permission indicators) for externally managed network pools, upserting network pools and/or subnets created by or on behalf of the external manager associated with the merging process being performed, and/or other pre-processing tasks, such as described herein. As an example, the disclosed subject matter can allow for, and the merger component 208 can perform, updating of flags when a new software version associated with an external network host configuration protocol (e.g., 120) comes out with new settings. As described herein, each externally managed network pool can have a group of flags (e.g., capability flags or indicators) that can determine which operations or changes administrators or the NMC 118 can be permitted to perform. The merger component 208 can utilize this pre-processing operation to update the flags for each externally managed network pool according to its external manager.

In certain embodiments, as the merge logic employed by the merger component 208 can be in the daemon of or associated with the merger component 208, the merger component 208 can load in the network configuration and use that to iterate over each network pool using desired functions. In some embodiments, employing some of such functions, the merger component 208 can be able to iterate over each network pool and update the flags (e.g., capability or permission flags or indicators) as desired (e.g., wanted, useful, or needed).

In some embodiments, as disclosed, as part of the pre-processing, the merger component 208 can be perform upserting. In this context, upserting can mean that the merger component 208 can update the network configuration and create network pools (also referred to as pools) or subnets that can be desired (e.g., wanted, useful, or needed) by a dynamic external manager, such as, for example, SLAAC or DHCP. In the case of SLAAC, the merger component 208 may have to create entirely new subnets and/or network pools based at least in part on the network addresses that can be learned from SLAAC and identified in the respective network configuration reports (e.g., IP reports) associated with the respective nodes of the node network 108. In addition, SLAAC network addresses can expire, which potentially can lead to the removal of network addresses (e.g., IP addresses) and interfaces from a SLAAC network pool. Non-limiting example upsert logic for SLAAC (and/or any future external method of network address management that can desire (e.g., want or require) dynamically generated network pools and subnets), which can be performed (e.g., executed) by the merger component 208), can be as follows:

```
for each IP Report:
   for each IP:
      check existing subnets for matching prefix/prefix length
      if no subnet exists:
         create new subnet(
            name=[TBD] ,
            family=[given family] ,
            prefix=[given prefix] ,
            description="Subnet_created_by_<source>")
      if the requesting interface came from a VLAN:
         enable VLAN on the new subnet add its vlan-id
      if no network pool exists that contains the IP:
         create new externally_managed pool(
            name=[TBD] ,
            description="Pool_created_by_<source>",
            alloc_method=externally_managed,
            flags=<flags for external_manager>)
      else if alloc_method != externally_managed:
         throw error // ip conflict?
      add interface and IP to pool
```

With further regard to network configuration report processing, it can be desirable (e.g., wanted, useful, or needed) for the NMC 118 to process each network address in a node-specific network configuration report file associated with an external network host configuration protocol (e.g., via the file system library) and save the network address in memory as a new struct that can be utilized for externally managed network addresses, with each node's collection of network configuration reports saved in the struct that can be utilized for a network configuration report associated with the node, such as described herein.

With further regard to merging a network pool associated with an external manager (e.g., 136), once the merger component 208 has read in all of the information (e.g., network configuration information and/or other information) from the respective network configuration reports associated with the respective nodes (e.g., 102, 104, and/or 106) and the external manager, the merger component 208 can proceed with the merging process (e.g., proceed with the actual merging operations of the merging process). The merger component 208 can perform the merge by iterating over each externally managed network pool of the external manager (e.g., 136), as such network pools are identified or indicated in the network configuration reports, by performing the following operations, for example:

for each network pool:
   if the external manager does not match the external manager associated with the merging process (e.g., the external manager with regard to which the merging process is being performed), such external manager (e.g., non-matching external manager) can be bypassed;
   with regard to the network pool associated with the external manager associated with the merging process, initialize the network pool members of or associated with the network pool;
   for each network address in the respective network configuration reports associated with the respective nodes:
      if the network address is determined to not be in the network pool, the merger component 208 can bypass that network address,
      add the interface-to-network address mapping in network pool members, and
      remove the network address from the network configuration report;
   if the merger component 208 determines that there are no changes with regard to a network address that is determined to be in the network pool, the merger component 208 can bypass the network address of the network pool; and the merger component 208 can save out the network pool members of the network pool (e.g., save the network pool members, comprising any existing network pool members and any new network pool members (if any), to memory of the file system).

For each externally managed network pool associated with a particular external manager, the NMC 118 can create an interface-to-network address mapping for the network pool, such as described herein. The merger component 208 can check to determine whether there is a pre-existing network pool members file stored on the file system of the node network 108. If there is such a pre-existing network pool members file stored on the file system of the node network 108, the NMC 118 can save the interface-to-network address mapping to utilize as a comparison at or near the end of the merging process, such as described herein.

After the merger component 208 has processed every network configuration report of every node (e.g., 102, 104, and/or 106) with respect to the external manager, the merger component 208 can check to determine whether the pre-existing interface-to-network address mapping read from the file system of the node network 108 is equivalent (e.g., matches, or satisfies defined match criteria) to the interface-to-network address mapping newly generated by the merger component 208 during the merging process, such as described herein. If the merger component 208 determines that the pre-existing interface-to-network address mapping is not equivalent (e.g., does not match, or does not satisfy the defined match criteria with respect) to the newly generated interface-to-network address mapping, the merger component 208 can write out the updates regarding the mapping (e.g., write out the newly generated interface-to-network address mapping) to the file system of the node network 108 (e.g., via the file API), such as described herein, or the NMC 118 can communicate (e.g., directly communicate) the network addresses and/or the associated interface-to-network address mapping to the desired (e.g., appropriate or wanted) node (e.g., without having to perform a file system write out of the mapping update). If, instead, the merger component 208 determines that the pre-existing interface-to-network address mapping is equivalent (e.g., matches, or satisfies the defined match criteria with respect) to the newly generated interface-to-network address mapping, the merger component 208 can determine that it is not desirable or necessary to write out the newly generated interface-to-network address mapping to the file system of the node network 108, and the pre-existing interface-to-network address mapping can continue to be utilized by the node network 108. At this point, the merging process can be complete with respect to that network pool (although the merging process can continue if there is any remaining network pool to be processed as part of the overall merging process).

With regard to handling unmerged network addresses (if there are any unmerged network addresses), after completing the merging process for each externally managed network pool associated with the particular external manager, the merger component 208 can check to determine whether there is any remaining network address in any of the network configuration reports associated with that external manager that has not been processed. Since, the merger component 208 can remove a network address after adding the network address to the network pool mapping, the only network addresses that may be remaining can be a network address that the merger component 208 was not able to match to a network pool. In some embodiments, the merger component 208 can log an error (e.g., via an error message) that such interface-to-network address mapping for the remaining network address was not able to be matched to a network pool.

With further regard to the node 102 of FIG. 3 (and the other drawings), the node 102 can comprise a write component 304 that can be utilized to perform write operations to write or facilitate writing data to the data store 302 and/or a memory component 306. For instance, the write component 304 can operate in conjunction with a client device (e.g., 110 or 114) or other communication device (e.g., 124 or 126) to enable the client device or other communication device to write data to the data store 302 and/or memory component 306. The write component 304 of the node 102 also can operate in conjunction with another node (e.g., 104 or 106) to write data from the other node to the data store 302 and/or memory component 306 of the node 102.

The memory component 306 of the node 102 can include one or more volatile or non-volatile memory sub-components (e.g., cache memory) that can be utilized to store data, such as the various types of data disclosed herein. The memory sub-components of the memory component 306 can comprise, for example, random access memory (RAM), synchronous RAM (SRAM), dynamic RAM (DRAM), synchronous DRAM (SDRAM), double data rate SDRAM (DDR SDRAM), enhanced SDRAM (ESDRAM), Synch-link DRAM (SLDRAM), direct Rambus RAM (DRRAM), non-volatile RAM (NVRAM), and/or other desired type of memory. One or more memory sub-components can be one or more caches.

The node 102 also can include a read component 308 that can facilitate (e.g., enable) a client device(s) (e.g., 110 or 114), other device(s) (e.g., 124 or 126), or other node (e.g., 104 or 106 to read a file(s), or a portion(s) of a file(s), from the data store 302 or the memory component 306 of the node 102, and the node 102 can provide the file(s), or portion(s) of the file(s), to the client device(s), other device(s), or other node(s) in response to a read request received by the read component 308 from the client device(s), other device(s), or other node(s).

The node 102 further can comprise an interface component 310 that can comprise various interfaces, such as, for example, network interfaces, application programming interfaces (APIs), interconnect interfaces, communication interfaces, a display screen, display interfaces, audio interfaces, haptic interface, and/or other desired interfaces, to facilitate (e.g., enable) transmitting or presenting information to a user or a device (e.g., service server, another node, or client or communication device, such as a computer, server, or mobile (e.g., smart) phone), or receiving information (e.g., query or request for a service; or request for information) from a service server or the NMC.

In some embodiments, the node 102 can comprise a service server 312 that can facilitate handling client requests received from communication devices and provisioning services for the communication devices in response to the client requests. In some embodiments, the service server 312 can be an SMB server that can employ a desired SMB protocol to facilitate establishing SMB sessions. For example, the service server 312 can employ the desired SMB protocol to facilitate servicing client requests with regard to data stored on the node. In other embodiments, the service server 312 can be or can comprise a different type of service server, such as an NFS server that can comprise a distributed file system and can employ an NFS protocol that can enable the sharing of file directories and files with clients over the node network. Users (e.g., clients) can, for example, add files to a shared file directory, and those files are able to be shared with other users who have access to that file directory. It is to be appreciated and understood that, in other embodiments, the node 102 can comprise one or more other types of service servers, in addition to or as an alternative to service server 312.

In accordance with various embodiments, the node 102 can comprise a processor component 314 that can include can work in conjunction with the other components (e.g., NMC 118a, data store 302, write component 304, memory component 306, read component 308, interface component 310, service server 312, network component 316, interconnect component 318, controller component 320, and/or another component) to facilitate performing the various functions of the node 102. The processor component 314 can employ one or more processors (e.g., one or more CPUs), microprocessors, or controllers that can process information relating to data (e.g., file data or other data), files, file systems, network configurations, network addresses, interfaces, interface identifiers, nodes, node identifiers, external network host configuration protocols, internal (e.g., centralized) network configuration protocols, network configuration reports, operational capability information associated with external network host configuration protocols, subnets, gateways, netmasks, MTUs, DNS, DNS configurations, network pools, allocation methods, DHCP, SLAAC, mappings of network addresses to interfaces, file or data formats, communication connection operations, read operations, write operations, data storage operations, data or file search operations, nodes, network of nodes, service servers, clients or other entities, communication (e.g., client or other communication) devices, applications, operating systems, hardware or virtual platforms, preferences (e.g., user or client preferences), applications, services, hash values, metadata, parameters, traffic flows, policies, defined network management criteria, algorithms (e.g., network management algorithms, hash algorithms, data compression algorithms, data decompression algorithms, and/or other algorithm), protocols, tools, and/or other information, to facilitate operation of the node 102, and control data flow between the node 102 and other components (e.g., another node(s), NMC, communication device, service server, file system, or other component) associated with the node 102.

The network component 316 can comprise network sub-components (e.g., Ethernet component (e.g., Ethernet ports and associated Ethernet sub-components), wireless communication connection component, or other network sub-component) that can enable the node 102 to network and communicate with one or more other nodes (e.g., nodes associated with a cluster), the NMC (e.g., NMC(s) of another node(s)), communication devices, service servers (e.g., service server(s) of another node(s)), and/or other components or devices. The network can employ IP for node-to-node communication between the node 102 and other nodes (e.g., other nodes associated with the cluster) associated with the node 102. For instance, a cluster of nodes of the storage system can comprise a back-end network, which can act as a backplane for the cluster, wherein can enable isolating node-to-node communication (e.g., between the node 102 and other nodes associated with the cluster) to a private, high-speed, low-latency network. The node 102 can support and utilize desired network communication protocols to communicate with other components or devices in a communication network (e.g., Internet, intranet, customer network, or other type of communication network), wherein the network communication protocols can comprise, for example, NFS, pNFS, SMB, CIFS, HCFS, HDFS, FTP, OpenStack Swift, HTTP, and/or other desired network communication protocols. The network component 316 also can comprise IP functionality that can allow the network component 316 and associated storage system to utilize communication protocols, such as IPv4 and IPV6, and be fully integrated with IPv4 and IPV6 environments. The node 102 can be associated with (e.g., assigned) respective IP addresses, including virtual IP addresses, that can be employed to facilitate enabling the node 102 to connect to client devices, other nodes, service servers, the NMC, and/or other components or devices. If the node 102 is offline for any reason, the IP addresses (e.g., virtual IP addresses) of the node 102 can be migrated (e.g., moved or transferred) to another node associated with the cluster (e.g., another node associated with a network of the cluster) to facilitate redistributing client devices to other nodes associated with the cluster if the node 102 is offline.

In certain embodiments, the node 102 can comprise the interconnect component 318 that can be associated with the network component 316 and/or other components to facilitate providing desired interconnects to the network component 316 and/or the other components. For instance, in some embodiments, a portion of the interconnect component 318 can be part of the network component 316. The interconnect component 318 can comprise various types of interconnects (e.g., interconnect sub-components) that can be utilized to connect the node 102 to other nodes of the cluster of nodes, connect various components (e.g., NMC 118a, data store 302, write component 304, memory component 306, read component 308, interface component 310, service server 312, processor component 314, network component 316, controller component 320, and/or another component) of the node 102, or connect the node 102 to other components (e.g., another node(s), NMC, client or communication device, service server, file system, or other component) of or associated with the node network system. The interconnects can comprise, for example, Ethernet interconnects or other low-latency interconnects (e.g., low-latency InfiniBand interconnects) that can be utilized to provide desirably fast and low-latency connections between respective components of or associated with the node 102. For instance, the memory component 306 (e.g., memory cache of the memory component 306) can communicate via a desirably fast (e.g., low-latency) interconnect (e.g., internal interconnect) of the interconnect component 318 to another memory component(s) of another node(s) of the cluster of nodes to desirably communicate or otherwise make available the data in the memory component 306 to the other memory component(s) or to access data in the other memory component(s), wherein such interconnect can have a significantly lower latency than accessing a hard disk drive of a node. The interconnect component 318 also can comprise desirably fast interconnects between different memory sub-components (e.g., different caches) of the memory component 306.

In some embodiments, the node 102 can comprise the controller component 320 that can be or can comprise a disk controller that can enable the processor component 314, or portion thereof, to communicate with the data store 302 (e.g., a hard disk of the data store 302) or other type of storage media or storage drive (e.g., disk drive) of or associated with the node 102. The controller component 320 also can provide or facilitate providing an interface between the hard disk or disk drive and other components of the node 102.

With further regard to the data store 302, the data store 302 can store data structures (e.g., user data, metadata), code structure(s) (e.g., modules, objects, hashes, classes, procedures) or instructions, information relating to data (e.g., file data or other data), files, file systems, network configurations, network addresses, interfaces, interface identifiers, nodes, node identifiers, external network host configuration protocols, internal (e.g., centralized) network configuration protocols, network configuration reports, operational capability information associated with external network host configuration protocols, subnets, gateways, netmasks, MTUs, DNS, DNS configurations, network pools, allocation methods, DHCP, SLAAC, mappings of network addresses to interfaces, file or data formats, communication connection operations, read operations, write operations, data storage operations, data or file search operations, nodes, network of nodes, service servers, clients or other entities, communication (e.g., client or other communication) devices, applications, operating systems, hardware or virtual platforms, preferences (e.g., user or client preferences), applications, services, hash values, metadata, parameters, traffic flows, policies, defined network management criteria, algorithms (e.g., network management algorithms, hash algorithms, data compression algorithms, data decompression algorithms, and/or other algorithm), protocols, tools, and/or other information, to facilitate controlling or performing operations associated with the node 102. The data store 302 can comprise volatile and/or non-volatile memory, such as described herein. In an aspect, the processor component 314 can be functionally coupled (e.g., through a memory bus) to the data store 302 in order to store and retrieve information desired to operate and/or confer functionality, at least in part, to the NMC 118a, data store 302, write component 304, memory component 306, read component 308, interface component 310, service server 312, processor component 314, network component 316, interconnect component 318, controller component 320, and/or another component, and/or substantially any other operational aspects of the node 102.

The disclosed subject matter (e.g., the systems, methods, techniques, and functions described herein), by employing an NMC and the techniques described herein that can desirably (e.g., suitably, efficiently, enhancedly, or optimally) manage integration of a first network configuration and related first group of network addresses externally managed by an external manager employing an external network host configuration protocol with a second (e.g., internal and/or centralized) network configuration and related second group of network addresses internally managed by an internal manager employing an internal network configuration protocol, can provide a number of advantages over existing techniques relating to network configurations. For instance, the NMC and the techniques described herein can desirably (e.g., suitably, efficiently, reliably, enhancedly, or optimally) perform such integration or merging of the first network configuration and related externally managed first group of network addresses with the second network configuration and related internally managed second group of network addresses, as compared to existing techniques for network configuration. Also, the disclosed subject matter, by separating the network configuration reporter function from the network configuration merger function, can enable the node network system to function such that each individual node (e.g., 102, 104, 106) is not required to update a centralized network configuration. This can ensure that as a cluster of nodes scales up to include dozens or hundreds of nodes, new scaling problems are not uncovered or encountered. Also, the disclosed subject matter, by separating the network configuration learner function from the network configuration reporter function, can enable the node network system to be produced and delivered as a framework such that additional network host configuration protocols can be supported in the future without rework, or at least without an undue or otherwise undesirable amount of rework. Further, the disclosed subject matter, by having the network configuration learner function report the capability flags and network host configuration protocol identifier, can enable the merger component 208 and data store 302 (e.g., global configuration store of the data store 302) to not have to be made aware of the specifics of each supported network host configuration protocol.

The solution provided by the disclosed subject matter (e.g., employing the NMC and techniques described herein) also can have the advantage of being highly flexible and highly scalable. The disclosed subject matter, including the NMC and techniques described herein, builds a desirable framework that can allow a distributed node system that assumes it has full control over the node network to be desirably extended to be aware of externally provided network addresses and networks. This solution provided by the disclosed subject matter can be highly flexible in that all protocol specific code and integration can be desirably constrained to the network configuration learner component. Further, the disclosed subject matter, by not requiring each node to update the global network configuration, can desirably avoid scaling issues which can otherwise be problematic on distributed node systems, as it can allow the network configuration report generator component 206 and the network configuration learner component 204 to be desirably less complex due in part to being agnostic of the complexities that can be inherent to dealing with distributed node systems. In addition, since the network configuration report generator component 206 can report the current state of what the network configuration should be, the network configuration report generator component 206 (or the NMC) desirably does not have to track incremental changes to the network configuration or the distributed node system. Further, the merger component 208 can be kept desirably less complex by desirably having the merger component 208 read data, such as network configuration reports, from shared storage (e.g., the data store 302 where the network configuration reports associated with all or desired nodes can be stored), and map and/or merge data and export it in a different format.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
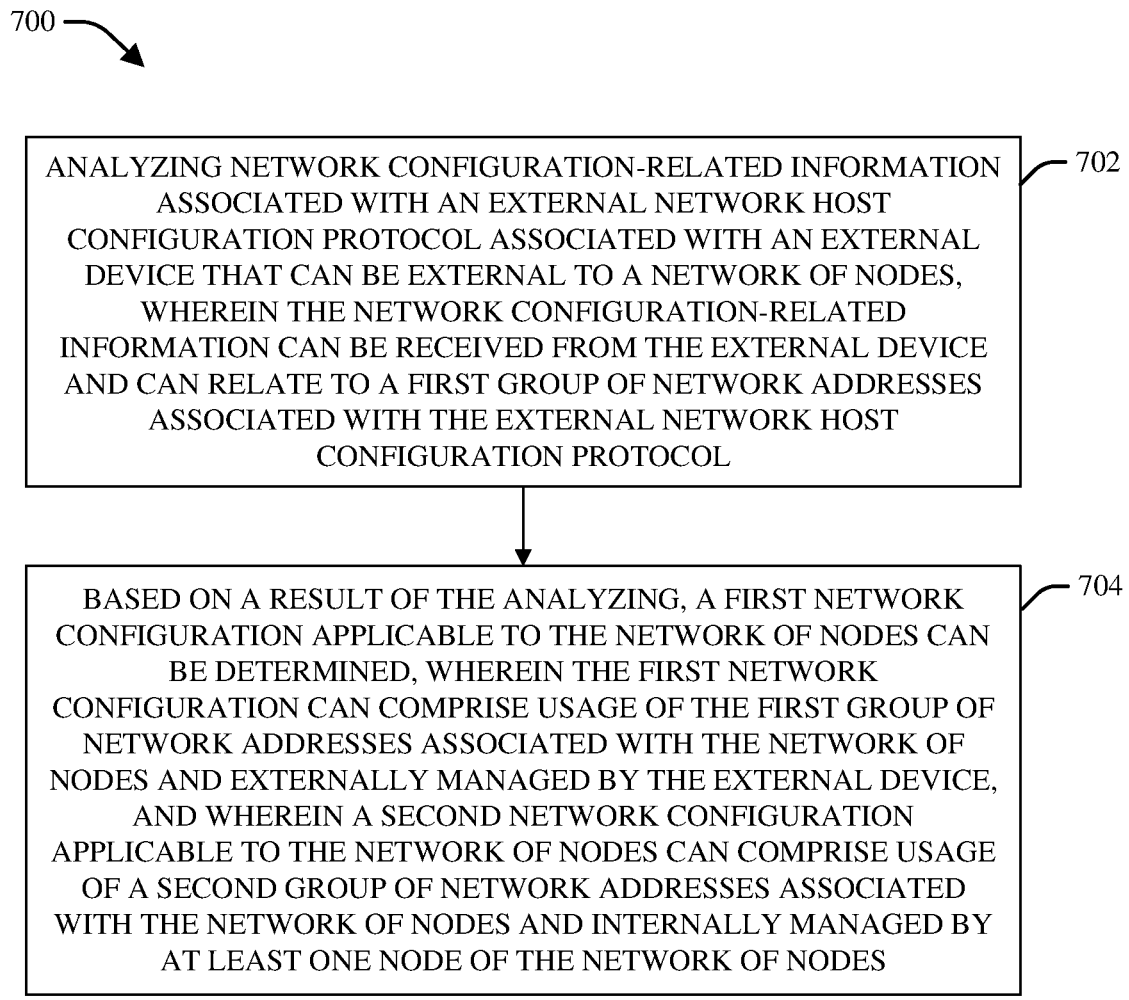
FIG. 7 illustrates a flow chart of an example method that can desirably perform and manage integration of a first network configuration relating to a first group of network addresses that can be managed using an external host configuration protocol external to a node network and a second network configuration relating to a second group of network addresses that can be internally managed by at least one node of the node network, in accordance with various aspects and embodiments of the disclosed subject matter.
Figure 8:
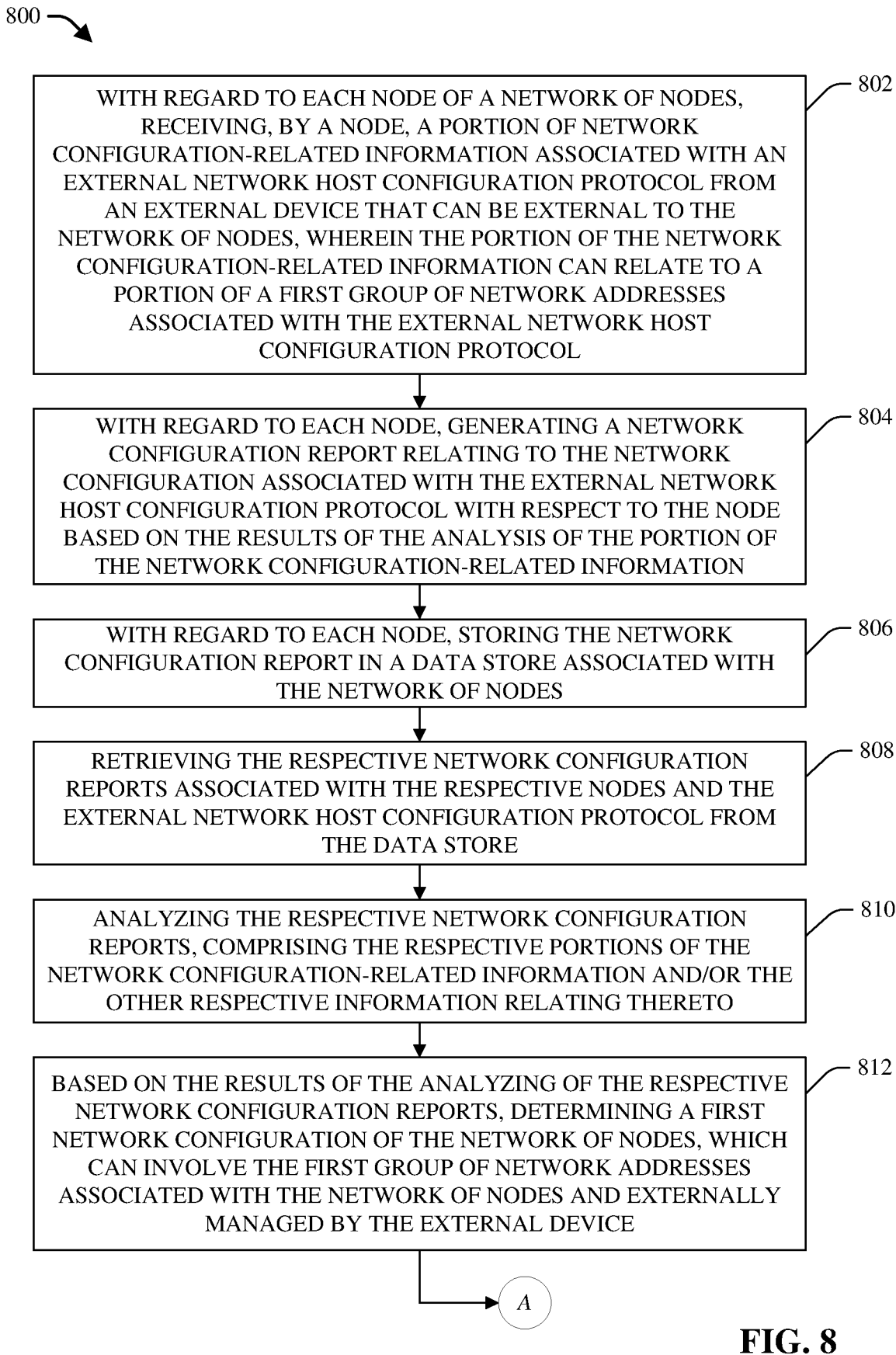
FIGS. 8 and 9 present a flow chart of another example method that can desirably perform and manage integration of a first network configuration relating to a first group of network addresses that can be managed using an external host configuration protocol external to a node network and a second network configuration relating to a second group of network addresses that can be internally managed by at least one node of the node network, in accordance with various aspects and embodiments of the disclosed subject matter.
Figure 9:
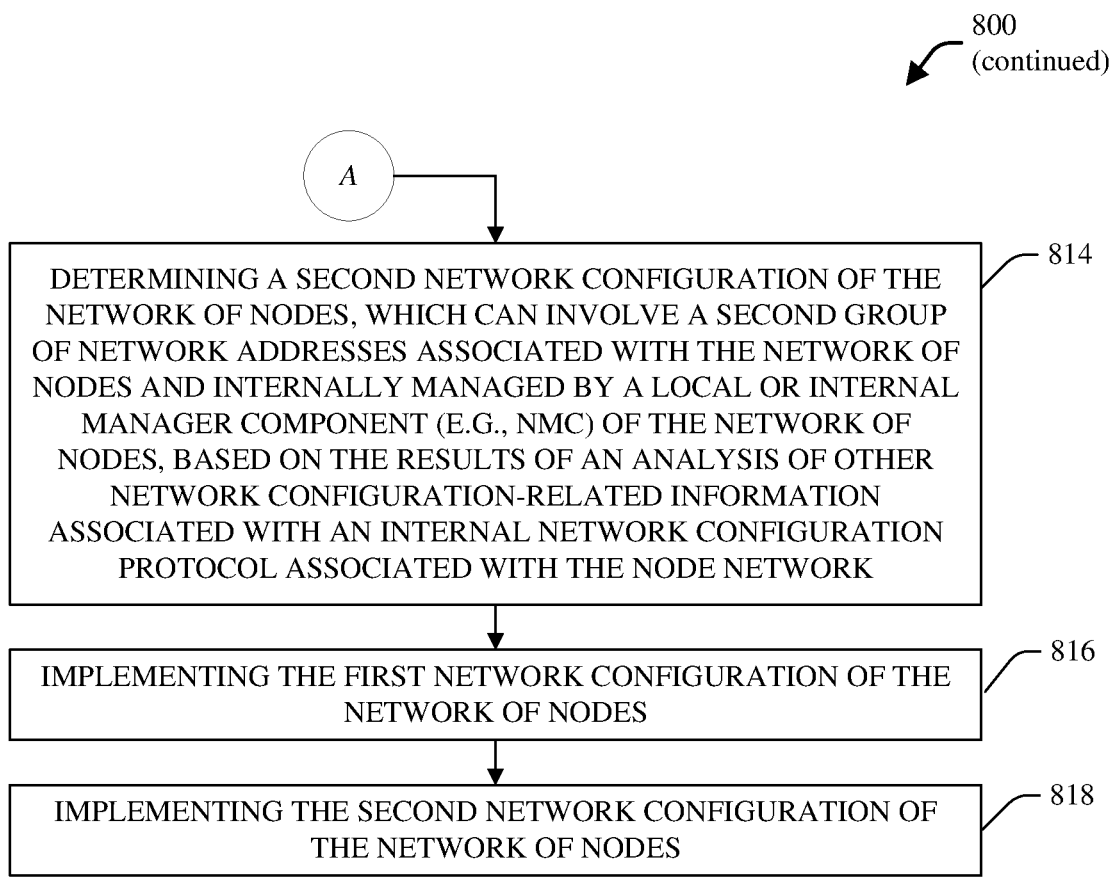

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 that can desirably (e.g., suitably, efficiently, or optimally) perform and manage integration of a first network configuration relating to a first group of network addresses that can be managed using an external host configuration protocol (e.g., by an external manager) external to a node network and a second network configuration relating to a second group of network addresses that can be internally managed by at least one node of the node network, in accordance with various aspects and embodiments of the disclosed subject matter. The method 700 can be employed by, for example, a system comprising the NMC, a processor component (e.g., of or associated with the NMC), and/or data store (e.g., of or associated with the NMC and/or the processor component).

At 702, network configuration-related information associated with an external network host configuration protocol can be analyzed wherein the external network host configuration protocol can be associated with an external device that can be external to a network of nodes, and wherein the network configuration-related information can be received from the external device and can relate to a first group of network addresses associated with the external network host configuration protocol. The NMC can analyze the network configuration-related information associated with an external network host configuration protocol.

At 704, based at least in part on a result of the analyzing, a first network configuration that can be applicable to the network of nodes can be determined, wherein the first network configuration can comprise usage of the first group of network addresses associated with the network of nodes and externally managed by the external device, and wherein a second network configuration can be applicable to the network of nodes can comprise usage of a second group of network addresses associated with the network of nodes and internally managed by at least one node of the network of nodes. For instance, based at least in part on a result of the analyzing, the NMC can determined the first network configuration of the network of nodes. In some embodiments, the NMC also can determine the second network configuration (e.g., a centralized network configuration) that can be applicable to the network of nodes based at least in part on the results of analyzing other network configuration-related information that can relate to the network of nodes and an internal network configuration protocol (e.g., an internal or centralized network configuration protocol for an administrator-defined network of network addresses) employed by the node network, wherein the second network configuration can comprise usage of the second group of network addresses associated with the network of nodes and internally managed by at least one node of the network of nodes.

FIGS. 8 and 9 present a flow chart of another example method 800 that can desirably (e.g., suitably, efficiently, or optimally) perform and manage integration of a first network configuration relating to a first group of network addresses that can be managed using an external host configuration protocol (e.g., by an external manager) external to a node network and a second network configuration relating to a second group of network addresses that can be internally managed by at least one node of the node network, in accordance with various aspects and embodiments of the disclosed subject matter. The method 800 can be employed by, for example, a system comprising the NMC, a processor component (e.g., of or associated with the NMC), and/or data store (e.g., of or associated with the NMC and/or the processor component).

At 802, with regard to each node of a network of nodes, a portion of network configuration-related information associated with an external network host configuration protocol can be received, by a node, from an external device that can be external to the network of nodes, wherein the portion of the network configuration-related information can relate to a portion of a first group of network addresses associated with the external network host configuration protocol. With regard to each node, a node (e.g., an NMC of or associated with the node) can receive the portion of the network configuration-related information associated with the external network host configuration protocol. With regard to the network of nodes, the network configuration-related information can comprise the respective portions of the network configuration-related information received from the external device by the respective nodes.

At 804, with regard to each node, a network configuration report relating to the network configuration associated with the external network host configuration protocol with respect to the node can be generated based at least in part on the results of the analysis of the portion of the network configuration-related information. With regard to each node, a node (e.g., an NMC of or associated with the node) can analyze the portion of the network configuration-related information, and, based at least in part on the results of such analysis, can generate a network configuration report (e.g., an IP report) relating to the network configuration (e.g., the desired network configuration) associated with the external network host configuration protocol with respect to (e.g., in relation to) the node. The network configuration report can comprise the network configuration-related information and/or other information relating thereto (e.g., other information determined or derived therefrom), such as described herein. Accordingly, with regard to the network of nodes, the respective nodes can generate respective network configuration reports with respect to the external network host configuration protocol (e.g., for each external network host configuration protocol) in relation to the respective nodes of the node network based at least in part on the respective results of the respective analysis the respective portions of the network configuration-related information.

At 806, with regard to each node, the network configuration report can be stored in a data store associated with the network of nodes. With regard to each node, a node (e.g., an NMC of or associated with the node) can store the network configuration report in the data store (e.g., centralized data store of or associated with an NMC and/or a node of the network of nodes). Accordingly, with regard to the network of nodes, the respective nodes can store the respective network configuration reports in the data store.

At 808, the respective network configuration reports associated with the respective nodes and the external network host configuration protocol can be retrieved from the data store. The NMC (e.g., an NMC of or associated with a node) can retrieve (e.g., read, receive, or obtain) the respective network configuration reports from the data store.

At 810, the respective network configuration reports, comprising the respective portions of the network configuration-related information and/or the other respective information relating thereto, can be analyzed. The NMC can analyze the respective network configuration reports.

At 812, based at least in part on the results of the analyzing of the respective network configuration reports, a first network configuration of the network of nodes, which can involve the first group of network addresses associated with the network of nodes and externally managed by the external device, can be determined. The NMC can determine the first network configuration of the network of nodes, wherein the first network configuration can involve the first group of network addresses associated with the network of nodes and externally managed by the external device, based at least in part on the results of the analyzing of the respective network configuration reports. For instance, the NMC can merge the respective network configuration reports, to facilitate determining and/or generating (e.g., creating) the first network configuration of the network of nodes associated with the external network host configuration protocol. At this point, the method 800 can proceed to reference point A, wherein the method 800 can continue from reference point A as presented in FIG. 9.

At 814, a second network configuration of the network of nodes, which can involve a second group of network addresses associated with the network of nodes and internally managed by a local or internal manager component (e.g., NMC) of the network of nodes, can be determined, based at least in part on the results of an analysis of other network configuration-related information associated with an internal network configuration protocol associated with the node network. The NMC can analyze the other network configuration-related information associated with the internal network configuration protocol. Based at least in part on the results of the analysis of the other network configuration-related information, the NMC can determine, implement, and/or manage the second network configuration of the network of nodes.

At 816, the first network configuration of the network of nodes can be implemented. At 818, the second network configuration of the network of nodes can be implemented. The NMC can implement (e.g., utilize or apply) or facilitate implementing the first network configuration of the network of nodes and the second network configuration of the network of nodes. In some embodiments, the NMC can implement or facilitate concurrently (e.g., in parallel or simultaneously) implementing the first network configuration of the network of nodes and the second network configuration of the network of nodes, which can facilitate (e.g., enable) external management of the first group of network addresses by the external device (e.g., using and/or in accordance with the external network host configuration protocol) with (e.g., concurrently, simultaneously, or in parallel with) internal management of the second group of network addresses by the local or internal manager component (e.g., NMC) of or associated with the network of nodes.

Figure 10:
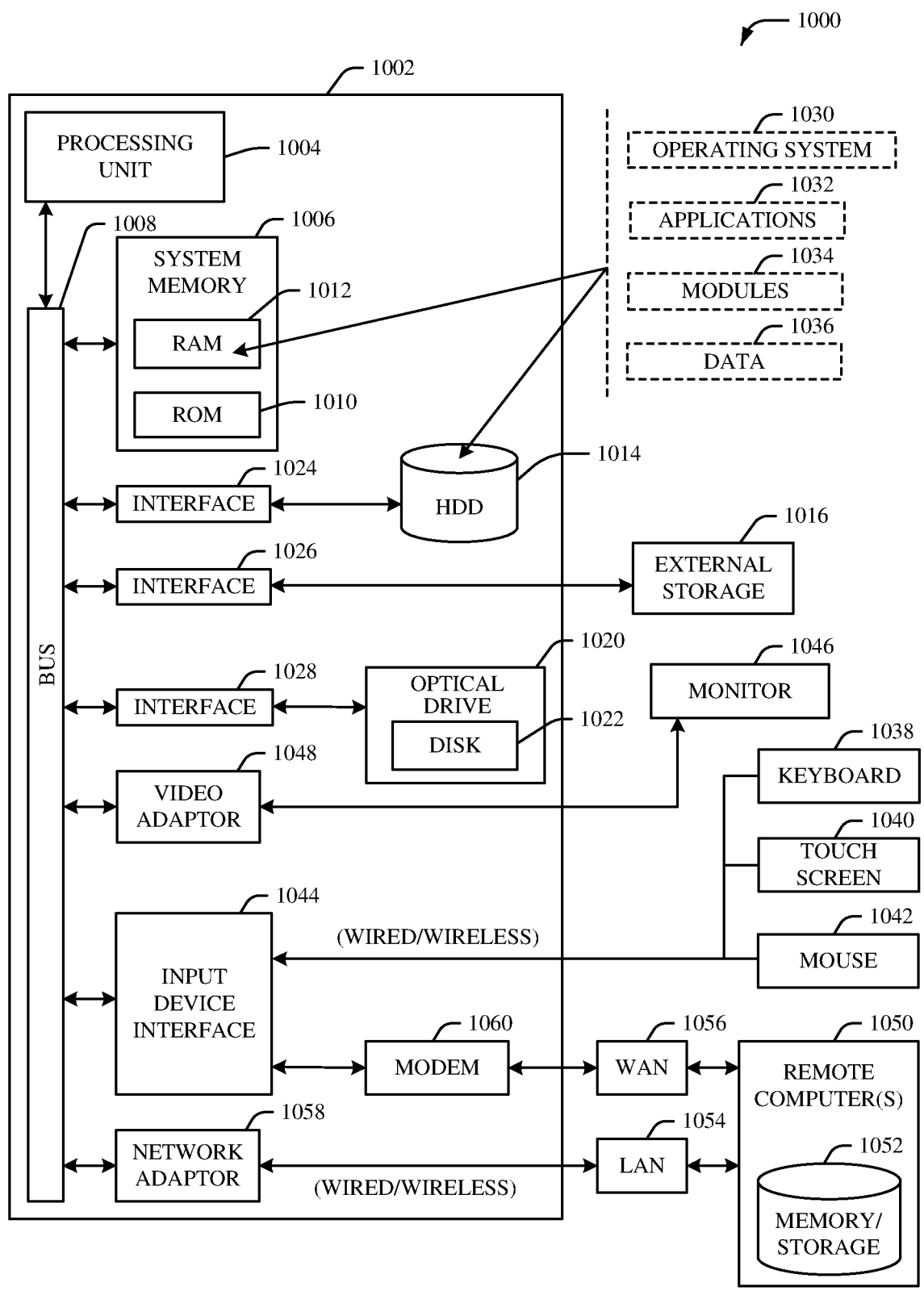
FIG. 10 illustrates an example block diagram of an example computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/ wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHZ radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component." "system," "platform," "framework." "layer." "interface." "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IoT) device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., node, cluster, network, NMC, interface, client device, communication device, external manager, processor component, data store, memory component, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
generating, by respective nodes of a system comprising at least one processor, respective network configuration reports comprising respective items of network configuration report information that indicate respective subgroups of network addresses of a first group of network addresses associated with an external network host configuration protocol, based on analyzing respective portions of network configuration-related information received by the respective nodes from an external device that is external to a network of nodes comprising the respective nodes, wherein the respective portions of network configuration-related information are associated with the external network host configuration protocol associated with the external device and indicate the respective subgroups of network addresses associated with the respective nodes and the external network host configuration protocol; and
based on a result of analyzing the respective items of network configuration report information of the respective network configuration reports, determining, by the system, a first network configuration applicable to the network of nodes, wherein the first network configuration enables the respective nodes to utilize any network address of the first group of network addresses as externally managed by the external device, and wherein a second network configuration applicable to the network of nodes comprises usage of a second group of network addresses associated with the network of nodes and internally managed by at least one node of the network of nodes.

2. The method of claim 1, further comprising:
implementing, by the system, the first network configuration applicable to the network of nodes; and
implementing, by the system, the second network configuration applicable to the network of nodes concurrently with the implementing of the first network configuration, to facilitate the first group of network addresses being externally managed by the external device concurrently with the second group of network addresses being internally managed by the at least one node of the network of nodes.

3. The method of claim 1, wherein the external network host configuration protocol comprises or is associated with a dynamic host configuration protocol, a stateless address autoconfiguration protocol, a stateless dynamic host configuration protocol, a network address configuration or assignment protocol, or a cloud computing service provider.

4. The method of claim 1, further comprising:
receiving, by the respective nodes of the system, the respective portions of the network configuration-related information associated with the external network host configuration protocol associated with the external device, wherein the respective items of network configuration report information comprise at least one of respective node identifiers associated with the respective nodes, an identifier associated with the external network host configuration protocol, respective items of network address information associated with respective network addresses of the first group of network addresses, respective items of interface information associated with respective interfaces of the respective nodes, or respective items of operational capability information relating to respective operational capabilities associated with the external network host configuration protocol; and
storing, by the respective nodes, the respective network configuration reports in a data store.

5. The method of claim 1, further comprising:
merging, by the system, the respective network configuration reports, comprising the respective items of network configuration report information, to facilitate creating the first network configuration applicable to the network of nodes that is associated with the external network host configuration protocol.

6. The method of claim 1, wherein the network configuration-related information associated with the external network host configuration protocol associated with the external device is first network configuration-related information associated with a first external network host configuration protocol associated with a first external device, and wherein the method further comprises:
analyzing, by the system, second network configuration-related information associated with a second external network host configuration protocol associated with a second external device that is external to the network of nodes, wherein the second network configuration-related information is received from the second external device and relates to a third group of network addresses associated with the second external network host configuration protocol; and
based on a result of the analyzing of the second network configuration-related information, determining, by the system, a third network configuration applicable to the network of nodes, wherein the third network configuration comprises usage of the third group of network addresses associated with the network of nodes and externally managed by the second external device.

7. The method of claim 1, wherein the network configuration-related information relates to the first group of network addresses, respective identifiers associated with respective interfaces associated with the respective nodes of the network of nodes, a subnet, a gateway, a netmask, a maximum transmission unit, a network pool, a domain name system configuration, or a virtual local area network tag.

8. The method of claim 1, wherein the result is a first result, and wherein the method further comprises:
analyzing, by the system, subnet information relating to one or more subnets associated with the network of nodes and the network configuration-related information associated with the external network host configuration protocol; and
based on a second result of the analyzing of the subnet information and the network configuration-related information, from the one or more subnets, determining, by the system, whether a subnet associated with the network of nodes exists that satisfies a defined subnet match criterion with respect to a subnet-related portion of the network configuration-related information.

9. The method of claim 8, further comprising:
in response to determining that the subnet associated with the network of nodes exists that satisfies the defined subnet match criterion based on the second result, utilizing, by the system, a copy of the subnet for the external network host configuration protocol; or
in response to determining that no subnet associated with the network of nodes exists that satisfies the defined subnet match criterion based on the second result, creating, by the system, a specified subnet that is able to be utilized with respect to the external network host configuration protocol based on the subnet-related portion of the network configuration-related information.

10. The method of claim 9, further comprising:
generating, by the system, a mapping that indicates one or more respective network addresses are to be configured on one or more respective interfaces associated with one or more of the respective nodes of the network of nodes, wherein the mapping is associated with a network pool associated with the specified subnet or the copy of the subnet;
storing, by the system, information relating to the mapping and the specified subnet or the copy of the subnet in a data store; and
managing, by the system, one or more respective connections to the one or more respective interfaces associated with the respective network addresses by the external device, based on the mapping, to facilitate communication of data between the external device and the one or more of the respective nodes of the network of nodes.

11. The method of claim 1, wherein the first network configuration applicable to the network of nodes comprises a network pool that relates to the first group of network addresses and is externally managed by the external device based on the external network host configuration protocol, and wherein the method further comprises:
from a group of operations associated with the network pool, determining, by the system, a subgroup of operations that are permitted to be performed on the network pool by an administrator based on operational capability information that indicates operational capabilities associated with the external network host configuration protocol, wherein the network configuration-related information comprises the operational capability information, wherein the administrator is part of the network of nodes, wherein the group of operations comprises a first operation and a second operation, wherein the first operation is determined to be part of the subgroup of operations, and wherein the second operation is determined not to be part of the subgroup of operations and is not permitted to be performed on the network pool by the administrator.

12. A system, comprising:
at least one memory that stores computer executable components; and
at least one processor that executes computer executable components stored in the at least one memory, wherein the computer executable components comprise:
a network manager that performs an analysis of respective items of network configuration report data of respective network configuration reports that are received from respective node devices and indicate respective subgroups of network addresses of a first group of network addresses associated with an external network host configuration protocol, wherein the respective node devices generate the respective network configuration reports based on respective portions of network configuration-related data associated with the external network host configuration protocol associated with an external device that is external to a cluster of node devices, comprising the respective node devices, that form a node device network, wherein the respective portions of network configuration-related data are received from the external device by the respective node devices and relate to the respective subgroups of network addresses,
wherein, based on a result of the analysis, the network manager determines a first network configuration of the cluster of node devices,
wherein the first network configuration enables the respective node devices to utilize respective network addresses of the first group of network addresses associated with the cluster of node devices and managed by the external device, and
wherein a second network configuration of the cluster of node devices relates to a second group of network addresses associated with the cluster of node devices and managed by at least one node device of the cluster of node devices.

13. The system of claim 12, wherein the result is a first result, wherein the network configuration-related data is first network configuration-related data, and wherein the network manager determines the second network configuration of the cluster of node devices that relates to the second group of network addresses associated with the cluster of node devices based on a second result of analysis of second network configuration-related data associated with the cluster of node devices.

14. The system of claim 12, wherein the network manager implements the first network configuration of the cluster of node devices and implements the second network configuration of the cluster of node devices in parallel with the implementation of the first network configuration, to facilitate the first group of network addresses being externally managed in parallel with the second group of network addresses being internally managed.

15. The system of claim 12, wherein the external network host configuration protocol comprises, or is associated with, at least one of a dynamic host configuration protocol, a stateless address autoconfiguration protocol, a stateless dynamic host configuration protocol, a network address configuration or assignment protocol, or a cloud computing service provider.

16. The system of claim 12, wherein the respective items of network configuration report data relate to the respective node devices and the external network host configuration protocol, and wherein the respective items of network configuration report data comprise at least one of respective node identifiers associated with the respective node devices, an identifier associated with the external network host configuration protocol, respective items of network address data associated with the respective network addresses of the first group of network addresses, respective items of interface data associated with respective interfaces of the respective node devices, or respective items of flag data relating to respective flags that indicate respective operational capabilities associated with the external network host configuration protocol.

17. The system of claim 12, wherein the respective network configuration reports are stored in a data store, wherein the network manager merges or fuses the respective network configuration reports, comprising the respective items of network configuration report data, to facilitate generating or implementing the first network configuration of the cluster of node devices that is associated with the external network host configuration protocol.

18. The system of claim 12, wherein the network configuration-related data relates to the first group of network addresses, respective identifiers associated with respective interfaces associated with the respective node devices of the cluster of node devices, a subnet, a gateway, a netmask, a maximum transmission unit, a network pool, a domain name system configuration, or a virtual local area network tag.

19. A non-transitory machine-readable medium, comprising executable instructions that, when executed by at least one processor, facilitate performance of operations, comprising:

creating, by respective nodes of a network of nodes, respective network configuration reports comprising respective items of network configuration report information that indicate respective subgroups of network addresses of a first group of network addresses associated with an external network host configuration protocol, based on analyzing respective portions of network configuration-related information received by the respective nodes from an external device that is external to the network of nodes, wherein the respective portions of network configuration-related information are associated with the external network host configuration protocol associated with the external device and indicate the respective subgroups of network addresses associated with the respective nodes and the external network host configuration protocol; and based on a result of evaluating the respective items of network configuration report information of the respective network configuration reports, determining a first network configuration usable by the network of nodes, wherein the first network configuration enables the respective nodes to utilize any network address of the first group of network addresses that is externally managed by the external device, and wherein a second network configuration usable by the network of nodes relates to a second group of network addresses associated with the network of nodes that is internally managed by at least one node of the network of nodes based on an internal network configuration protocol.

20. The non-transitory machine-readable medium of claim 19, wherein the network configuration-related information relates to the first group of network addresses, respective identifiers associated with respective interfaces associated with the respective nodes of the network of nodes, a subnet, a gateway, a netmask, a maximum transmission unit, a network pool, a domain name system configuration, or a virtual local area network tag.

* * * * *